(12) United States Patent
Dai et al.

(10) Patent No.: US 12,140,961 B2
(45) Date of Patent: Nov. 12, 2024

(54) AUTOMATIC ROLLER PATH TRACKING AND MAPPING FOR PAVEMENT COMPACTION USING INFRARED THERMOGRAPHY

(71) Applicant: West Virginia University Board of Governors on Behalf of West Virginia University, Morgantown, WV (US)

(72) Inventors: Fei Dai, Morgantown, WV (US); Linjun Lu, Morgantown, WV (US)

(73) Assignee: West Virginia University Board of Governors on Behalf of West Virginia University, Morgantown, WV (US)

( * ) Notice: Subject to any disclaimer, the term of this patent is extended or adjusted under 35 U.S.C. 154(b) by 266 days.

(21) Appl. No.: 17/536,418

(22) Filed: Nov. 29, 2021

(65) Prior Publication Data
US 2022/0187842 A1    Jun. 16, 2022

Related U.S. Application Data

(60) Provisional application No. 63/124,120, filed on Dec. 11, 2020.

(51) Int. Cl.
*G05D 1/00* (2024.01)
*B60R 1/22* (2022.01)
(Continued)

(52) U.S. Cl.
CPC ............. *G05D 1/0242* (2013.01); *B60R 1/22* (2022.01); *B60R 11/04* (2013.01); *E01C 19/288* (2013.01);
(Continued)

(58) Field of Classification Search
CPC .......... G05D 1/0242; G05D 1/02; B60R 1/22; B60R 11/04; E01C 19/288; E01C 19/488;
(Continued)

(56) References Cited

U.S. PATENT DOCUMENTS

| | | | |
|---|---|---|---|
| 2009/0142133 A1* | 6/2009 | Glee | E01C 19/48 404/90 |
| 2016/0222602 A1* | 8/2016 | Downing | G05D 1/0246 |

(Continued)

OTHER PUBLICATIONS

ASCE. (2017), 2017 Infrastructure Report Card.
(Continued)

*Primary Examiner* — Basil T. Jos
(74) *Attorney, Agent, or Firm* — Thomas | Horstemeyer, LLP

(57) ABSTRACT

Disclosed is a thermal-based automatic roller tracking and mapping system for roller path tracking and mapping in pavement compaction. Accuracy in estimation during roller position tracking and mapping for pavement compaction through the use of thermal imaging is achieved. The tracking and mapping system utilizes an infrared camera for automatic roller path tracking and mapping in pavement construction. The tracking and mapping data associated with the movement of the roller vehicle during compaction of the surface can be generated and visually represented in a user interface accessible to the operator of the roller vehicle. Based on the tracking and mapping data that is generated in real-time and presented to the operator in the user interface, the operator can make adjustments to the roller vehicle and path, as necessary.

20 Claims, 12 Drawing Sheets

(51) Int. Cl.
  B60R 11/04 (2006.01)
  E01C 19/28 (2006.01)
  H04N 5/33 (2023.01)
  E01C 19/48 (2006.01)
(52) U.S. Cl.
  CPC ............ *H04N 5/33* (2013.01); *B60Y 2200/41* (2013.01); *B60Y 2400/3015* (2013.01); *E01C 19/488* (2013.01); *G05D 1/02* (2013.01)
(58) Field of Classification Search
  CPC .................. H04N 5/33; B60Y 2200/41; B60Y 2400/3015
  See application file for complete search history.

(56) References Cited

U.S. PATENT DOCUMENTS

| | | | | |
|---|---|---|---|---|
| 2019/0106846 | A1* | 4/2019 | Marsolek | E01C 19/23 |
| 2021/0181354 | A1* | 6/2021 | Becher | G01S 19/01 |
| 2022/0337810 | A1* | 10/2022 | Tauber | G06T 5/80 |

OTHER PUBLICATIONS

Beainy, F., Commuri, S. & Zaman, M. (2012), Quality Assurance of Hot Mix Asphalt Pavements Using the Intelligent Asphalt Compaction Analyzer, Journal of Construction Engineering and Management, 138(2), 178-187.
Borges, P. V. K. & Vidas, S. (2016), Practical Infrared Visual Odometry, IEEE Transactions on Intelligent Transportation Systems, 17(8), 2205-2213.
Campbell, J., Sukthankar, R. & Nourbakhsh, I. (2004), Techniques for Evaluating Optical Flow for Visual Odometry in Extreme Terrain, 2004 IEEE/RSJ International Conference on Intelligent Robots and Systems (IROS)(IEEE Cat. No. 04CH37566), IEEE, pp. 3704-3711.
Chang, G. & Gallivan, V. L. (2011), Accelerated Implementation of Intelligent Compaction Technology for Embankment Subgrade Soils, Aggregate Base, and Asphalt Pavement Materials, United States. Federal Highway Administration.
Cho, Y. K., Bode, T., Song, J. & Jeong, J.-H. (2012), Thermography-Driven Distress Prediction from Hot Mix Asphalt Road Paving Construction, Journal of Construction Engineering and Management, 138(2), 206-214.
Daniel, J. S. (2006), Use of an Infrared Joint Heater to Improve Longitudinal Joint Performance in Hot Mix Asphalt Pavements, Journal of performance of constructed facilities, 20(2), 167-175.
FHWA/FTA. (2017), 2015 Status of the Nation's Highways, Bridges, and Transit Conditions & Performance Report to Congress, Government Printing Office.
Fitzgibbon, A., Pilu, M. & Fisher, R. B. (1999), Direct Least Square Fitting of Ellipses, IEEE Transactions on pattern analysis and machine intelligence, 21(5), 476-480.
Gallivan, V. L., Chang, G. K. & Horan, R. D. (2011), Practical Implementation of Intelligent Compaction Technology in Hot Mix Asphalt Pavements, Asphalt paving technology(80), 1-32.
Horan, R. D., Chang, G. K., Xu, Q. & Gallivan, V. L. (2012), Improving Quality Control of Hot-Mix Asphalt Paving with Intelligent Compaction Technology, Transportation research record, 2268(1), 82-91.
Huang, G. P., Mourikis, A. I. & Roumeliotis, S. I. (2008), Analysis and Improvement of the Consistency of Extended Kalman Filter Based Slam, 2008 IEEE International Conference on Robotics and Automation, IEEE, pp. 473-479.
Imran, S. A., Barman, M., Nazari, M., Commuri, S., Zaman, M. & Singh, D. (2016), Continuous Monitoring of Subgrade Stiffness During Compaction, Transportation Research Procedia, 17, 617-625.
Kassem, E., Liu, W., Scullion, T., Masad, E. & Chowdhury, A. (2015), Development of Compaction Monitoring System for Asphalt Pavements, Construction and Building Materials, 96, 334-345.

Khattak, S., Papachristos, C. & Alexis, K. (2019), Keyframe-Based Direct Thermal-Inertial Odometry, 2019 International Conference on Robotics and Automation (ICRA), IEEE, pp. 3563-3569.
Li, Z., Madanu, S., Zhou, B., Wang, Y. & Abbas, M. (2010), A Heuristic Approach for Selecting Highway Investment Alternatives, Computer-Aided Civil and Infrastructure Engineering, 25(6), 427-439.
Liu, D., Chen, J. & Li, S. (2019), Collaborative Operation and Real-Time Control of Roller Fleet for Asphalt Pavement Compaction, Automation in Construction, 98, 16-29.
Liu, F., Gleicher, M., Wang, J., Jin, H. & Agarwala, A. (2011), Subspace Video Stabilization, ACM Transactions on Graphics (TOG), 30(1), 1-10.
Liu, J., Yang, X., Lau, S., Wang, X., Luo, S., Lee, V. C. S. & Ding, L. (2020), Automated Pavement Crack Detection and Segmentation Based on Two-Step Convolutional Neural Network, Computer-Aided Civil and Infrastructure Engineering, 1-15.
Lucas, B. D. & Kanade, T. (1981), An Iterative Image Registration Technique with an Application to Stereo Vision.
Mouats, T., Aouf, N., Chermak, L. & Richardson, M. A. (2015), Thermal Stereo Odometry for Uavs, IEEE Sensors Journal, 15(11), 6335-6347. Nhtsa. (2016), 2015 Motor Vehicle Crashes: Overview Nhtsa Report, pp. 1-9.
Plati, C., Georgiou, P. & Loizos, A. (2014), Use of Infrared Thermography for Assessing HMA Paving and Compaction, Transportation Research Part C: Emerging Technologies, 46, 192-208.
Savan, C. M., Ng, K. W. & Ksaibati, K. (2016), Benefit-Cost Analysis and Application of Intelligent Compaction for Transportation, Transportation Geotechnics, 9, 57-68.
Shi, J. & Tomasi, C. (1994), Good Features to Track, 1994 Proceedings of IEEE conference on computer vision and pattern recognition, IEEE, pp. 593-600.
Shin, Y. S. & Kim, A. (2019), Sparse Depth Enhanced Direct Thermal-Infrared Slam Beyond the Visible Spectrum, IEEE Robotics and Automation Letters, 4(3), 2918-2925.
Szeliski, R. (2010), Computer Vision: Algorithms and Applications, Springer Science & Business Media.
Torr, P. H. & Zisserman, A. (2000), Mlesac: A New Robust Estimator with Application to Estimating Image Geometry, Computer vision and image understanding, 78(1), 138-156.
Vidas, S. & Sridharan, S. (2012), Hand-Held Monocular Slam in Thermal-Infrared, 2012 12th International Conference on Control Automation Robotics & Vision (ICARCV), IEEE, pp. 859-864.
Xiao, J., Xiong, W., Yao, Y., Li, L. & Klette, R. (2020), Lane Detection Algorithm Based on Road Structure and Extended Kalman Filter, International Journal of Digital Crime and Forensics (IJDCF), 12(2), 1-20.
Yan, X., Zhang, H. & Li, H. (2020), Computer Vision-Based Recognition of 3D Relationship between Construction Entities for Monitoring Struck-by Accidents, Computer-Aided Civil and Infrastructure Engineering.
Yang, C., Tsai, Y. & Wang, Z. (2009), Algorithm for Spatial Clustering of Pavement Segments, Computer-Aided Civil and Infrastructure Engineering, 24(2), 93-108.
Yao, L., Dong, Q., Jiang, J. & Ni, F. (2020), Deep Reinforcement Learning for Long-Term Pavement Maintenance Planning, Computer-Aided Civil and Infrastructure Engineering.
Yoon, H., Elanwar, H., Choi, H., Golparvar-Fard, M. & Spencer Jr, B. F. (2016), Target-Free Approach for Vision-Based Structural System Identification Using Consumer-Grade Cameras, Structural Control and Health Monitoring, 23 (12), 1405-1416.
Yoon, H., Shin, J. & Spencer Jr, B. F. (2018), Structural Displacement Measurement Using an Unmanned Aerial System, Computer-Aided Civil and Infrastructure Engineering, 33(3), 183-192.
Yoon, S., Hastak, M. & Lee, J. (2018), Suitability of Intelligent Compaction for Asphalt Pavement Quality Control and Quality Assurance, Journal of Construction Engineering and Management, 144(4), 04018006.
Zhang, C. & Elaksher, A. (2012), An Unmanned Aerial Vehicle-Based Imaging System for 3D Measurement of Unpaved Road Surface Distresses 1, Computer-Aided Civil and Infrastructure Engineering, 27(2), 118-129.

(56) References Cited

OTHER PUBLICATIONS

Zhang, Z. (2000), A Flexible New Technique for Camera Calibration, IEEE Transactions on pattern analysis and machine intelligence, 22(11), 1330-1334.
Zhou, H. F., Lu, L. J., Li, Z. Y. & Ni, Y. Q. (2020), Exploration of Temperature Effect on Videogrammetric Technique for Displacement Monitoring, Smart Structures and Systems, 25(2), 135-153.
2015 Motor Vehicle Crashes: Overview Nhtsa Report, pp. 1-9.

* cited by examiner

Fig. 4. Regional division from binary operation and boundary fitting results: (a) raw thermal images; (b) binary images and (c) boundary fitting

AUTOMATIC ROLLER PATH TRACKING AND MAPPING FOR PAVEMENT COMPACTION USING INFRARED THERMOGRAPHY

CROSS-REFERENCE TO RELATED APPLICATIONS

This application is a continuation of, and claims priority to, U.S. Patent Application entitled "AUTOMATIC ROLLER PATH TRACKING AND MAPPING FOR PAVEMENT COMPACTION USING INFRARED THERMOGRAPHY," filed on Dec. 11, 2020, under Ser. No. 63/124,120, which is incorporated herein by reference in its entirety.

STATEMENT REGARDING FEDERALLY SPONSORED RESEARCH OR DEVELOPMENT

This invention was made with Government support under Contract/Grant No. 69A3551847103 awarded by the Center for Integrated Asset Management for Multimodal Transportation Infrastructure Systems (CIAMTIS), a US Department of Transportation University Transportation Center. The Government has certain rights in this invention.

BACKGROUND

Highways are the critical transportation system to connect the local communities, regions and the nation for economic communication and population mobility. The successful service of highways significantly depends upon the performance of pavement in a long-lasting period. However, the overall condition of the Nation's highways was rated in "D" grade (poor condition). To repair and rehabilitate the poor-condition highways, it would require an increase in combined national highway investment of $37.3 billion per year through 2032. Meanwhile, the poor-condition highways may lead to a series of problems, such as the extra vehicle repair and operation costs ($120.5 billion in 2015), motor vehicle fatalities and injuries (35,092 deaths and 2,443,000 injuries in 2015), traffic congestions and delays (6.9 billion hours in traffic delay and $160 billion in time and fuel waste in 2014). An underlying reason behind is that the compacted pavement materials did not meet required specifications during their construction, leaving some soft spots or poorly compacted longitudinal joints across the pavement, leading it to deteriorate and degrade quickly, and eventually turn into defects and damages.

Proper compaction plays a vital role in ensuring the long-lasting performance of asphalt pavement and thereby may solve the above-mentioned problems fundamentally. Quality control is a process to ensure satisfactory quality of asphalt pavement being compacted. It is usually deemed to be the contractors' responsibility. A conventional practice used to control the compaction quality is to establish a rolling pattern with well-determined compaction parameters including the roller trajectory, number of roller passes, traveling speed and overlap distance between two adjacent stripes. Then, the operator is required to continuously ensure the roller to cover the entire pavement uniformly by following the pre-established rolling pattern. However, this manual procedure is often error-prone due to the lack of real-time feedback of compaction parameters. This inevitably causes discrepancies between the actual path and the planned pattern after a long operation.

Intelligent compaction (IC) is an innovative technology that has been developed to help improve the compaction quality of asphalt pavement. With implementation of the Global Positioning System (GPS), the IC technology can provide visible roller position, traveling speed and number of roller passes in real time, thus allowing the operator to timely monitor and adjust compaction efforts so as to achieve a more uniform rolling pattern and high-quality compaction performance. However, the high equipment cost and signal disturbance impede the GPS-based IC from wide adoption by the contractors and agencies for implementation in their projects. A low-cost yet applicable alternative would be desirable.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
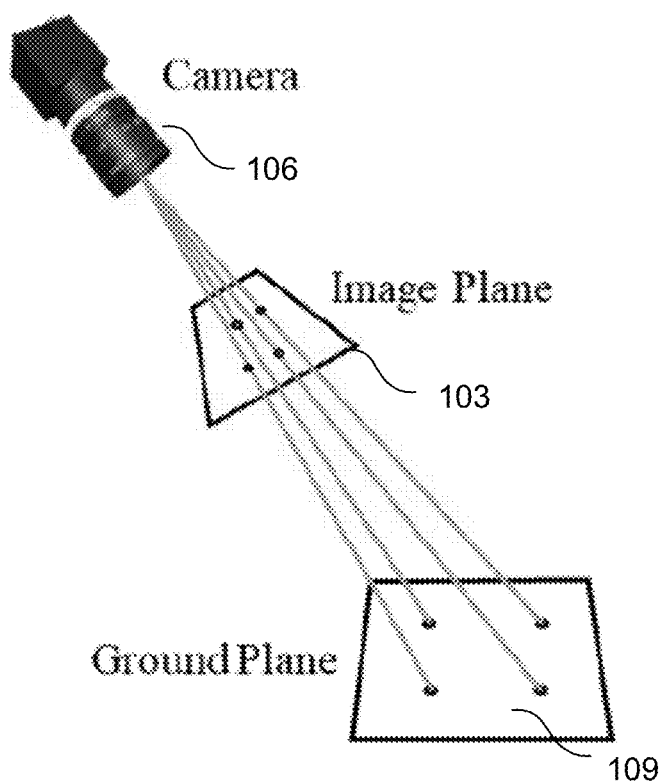
FIG. 1 illustrates an example of an illustration of projective transformation using homography matrix in accordance to various embodiments of the present disclosure.

The present disclosure relates to a thermal-based automatic roller tracking and mapping system for roller path tracking and mapping in pavement compaction. According to various embodiments, accuracy in estimation during roller position tracking and mapping for pavement compaction through the use of thermal imaging is achieved, providing a promising alternative to the current GPS-based IC. According to various embodiments of the present disclosure, the tracking and mapping system of the present disclosure utilizes an infrared camera for automatic roller path tracking and mapping in pavement construction. The tracking and mapping data associated with the movement of the roller vehicle during compaction of the surface can be generated and visually represented in a user interface accessible to the operator of the roller vehicle. Based on the tracking and mapping data that is generated in real-time and presented to the operator in the user interface, the operator can make adjustments to the roller vehicle and path, as necessary.

Asphalt (blacktop) is the preferred material for use in roadway paving as compared to other materials (e.g., concrete, dirt). Asphalt provides a smoother road surface for drivers resulting in lower friction between the tires and the road surface, providing better fuel economy and reduced GHG/$CO_2$ emissions, ease of construction, lower initial construction costs as compared to concrete, reduced maintenance costs, and as a result of the "black" color asphalt absorbs sunlight quicker leading to more efficient snow/ice melting during cold weather operations. Even with the many benefits of asphalt, concrete is often used for road paving, particularly on high traffic, heavy truck volume roads (e.g., interstate highways) since concrete typically lasts longer than blacktop.

Even though asphalt is the preferred choice for a road surface use of this material has a variety of problems, including cracking (e.g., alligator, joint, transverse, edge, block, linear), potholes, depressions, rutting, and raveling. Some of these defects are caused by water intrusion into the asphalt during its life, normal settling of the material over time, vehicle induced stresses, expansion/contraction, and environmental effects (e.g., sun, temperature variations, humidity, road chemicals (oil, gasoline, salt)). If professionally designed, constructed, and maintained, the average life for an asphalt road is 25 years.

One of the keys to a prolonged life for an asphalt road is proper compaction during construction. For asphalt mixtures, compaction locks the asphalt-coated aggregate particles together to achieve stability and provide resistance to deformation (or rutting) while simultaneously reducing the permeability of the mixture and improving its durability. There are many factors that affect the compactibility of asphalt mixtures, including its ' properties (e.g., viscosity, permeability, composition, size/shape of particles, temperature), the type and density of the underlying base course material (e.g., sand, gravel), the thickness of the applied asphalt layer, and the environmental conditions at the time of placement (e.g., ambient temperature, ground temperature, wind speed, humidity). If any of these factors change, the final modulus and stiffness or strength of the mix will be directly affected. Additionally, the final compactibility of the mix is affected by the type of roller machine (e.g., pneumatic, single roller, double/tandem roller, vibratory), the number of rollers, rolling pattern, number of roller passes, and rolling speed used during the compaction process.

During construction, the compaction of a hot mix asphalt (HMA) is conducted by use of three basic types of equipment: the paver screed, the steel wheel roller (single, tandem, vibratory), and the pneumatic tire roller. Traditional application techniques (asphalt roller equipment) used to compress asphalt are inaccurate and often based on the judgment and experience of the operator regarding the number of passes, rolling speed, and applied weight, often resulting in decreased roadway life, higher maintenance costs, and extensive repair/replacement operations. After an HMA has been installed and cooled, a series of core samples can be taken of the final asphalt material and sent to a lab for analysis to determine porosity, permeability, air void volume, density, etc. This technique is the most accurate means available to assess the asphalt's properties, but it is performed post-installation, and any detected problems will entail repair/removal of the asphalt surface, which can be expensive. Coring is also expensive, and a limited core program may not be indicative of the compaction profile within an entire road.

In recent years, intelligent compaction (IC) technology has been investigated and used to a limited degree on vibratory rollers and roller machines for use in providing uniform/optimum compaction levels during installation. IC technology is based on the use of accelerometers to measure the asphalt's response to vibratory impulses applied by the vibratory rollers to the pavement. A general definition of IC is that it is a measurement system composed of hardware, software, temperature measurement devices, accelerometers, GPS, and analysis equipment that are installed on rollers with the purpose of improving the compaction process by providing the operator with continuous information on the rollers position, pavement temperature, asphalt compaction information, and the number of roller passes. IC rollers provide the capability to adjust compaction levels on-the-fly and to develop a color-coded mapping of the roadway being compacted in real-time. IC capabilities have the potential to revolutionize the compaction equipment industry by providing real-time, continuous feedback to the operator during the compaction process.

Conventional Compaction Operations in Asphalt Pavement Construction

Compaction is an important procedure to ensure the high-quality performance of asphalt pavement construction.

It is defined as the procedure that uses a roller to densify the loose pavement material by compressing the material into a smaller volume and ultimately producing a stable condition with enhanced internal strength and low permeability. This process affects the performance properties of asphalt pavement to a great extent. Over-compaction will lead to low air void content and crushing of aggregates, causing asphalt bleeding and rutting under adverse weather conditions or traffic loads. On the other hand, under-compaction will leave too much-undesired air void content between asphalt aggregates, making it susceptible to oxidation and water permeability issues. In order to achieve the desired quality level and avoid substandard compaction, a uniform rolling pattern covering the entire constructed pavement is imperative. Since the design of a rolling pattern is largely dependent on several critical factors, such as types of materials, lift thickness, ambient temperature and underlying support density, it varies in different pavement construction projects.

The parameters of a well-designed and controllable rolling pattern should include but not limited to the compaction trajectory, rolling passes, traveling speed and overlap distance between two adjacent stripes. Once the rolling pattern is determined by contractors or technical directors, the operator is required to manipulate the roller by following the established travel routine and maintaining the rolling pattern uniformly over the entire pavement. However, human errors inevitably involve in the roller compaction operations and consequently render a deviation between the executed routine and the planned pattern. This deviation has a high possibility to cause some improper-compacted longitudinal areas on the overlap between two adjacent stripes or soft points across the pavement surface. Although the post-compaction spot testing is a highly accurate method that is frequently used in pavement construction to detect quality defects and assess the uniformity and density level of the compacted pavement, the characteristic of point-wise testing results in fact may only represent less than one percent information of the pavement and will leave a numerous amount of poorly compacted areas undetected. Furthermore, these sampling points might lead to low-quality areas that will degrade and deteriorate quickly, and significantly shorten the service life of the pavement.

Intelligent Compaction

With technological advancement and promotion from the Federal Highway Administration (FHWA) and the industry, the IC technology has been developed as an excellent quality control means in improving the compaction performance of asphalt pavement, capable of monitoring and displaying the compaction parameters in real time. Generally, the IC technology refers to a roller equipped with a measurement system that consists of a highly accurate GPS system, accelerometers, infrared thermometers, and an onboard computer reporting system. The IC technology can maintain a continuous record of color-coded plots that indicate the roller location, the number of rolling passes, surface temperature of pavement and compaction effectiveness. Besides, it can automatically store the compaction performance parameters for 100% coverage of the construction area, which can be used for further quality inspection and maintenance. Since IC shows several superiorities over the conventional compact process in quality control and record documentation, the use of IC for pavement construction has been introduced in a number of studies in the last two decades.

As for the IC technology in asphalt pavement compaction, the GPS is the core equipment, because it can provide timely updated roller position and number of rolling passes, allowing operators to continuously monitor and correct their compaction operations to maintain a consistent rolling pattern and ensure higher quality pavement performance. Nevertheless, there still exist some drawbacks associated with implementation of the GPS-based IC technology. The first is the high equipment cost. Generally, retrofitting an existing roller with an IC system is approximately 30% higher (about $100,000) than the normal cost, in which the GPS has a large portion of shares. The cost is untrivial to contractors and oftentimes will increase the construction estimation. The second is the restrained applicability of GPS-enabled technology. In case that the radio line of sight between the GPS and the base station is disturbed, which is the often case in the mountain and rural areas or the roller distance to the base station exceeds two miles, it oftentimes prevents the GPS receiver from getting a positional lock, causing holes in the absolute positioning data. Consequently, the system requires effort on the ground to relocate and reset the reference station once it is out of reach. These make the contractors and the highway agencies hesitate to adopt this technology, and a low-cost alternative would be desirable.

Visual Odometry Using Infrared Thermography

Having been aware of the limitations of traditional visual odometry using regular cameras in some adverse environmental conditions, such as fog, smoke and poor illumination, some researchers have dedicated to exploiting infrared as an alternative or supplementary modality for visual odometry. A first known use of infrared camera for visual odometry demonstrated the possibility of utilizing thermal-infrared modality for indoor visual odometry applications. After that, a visual odometry system carrying a pair of thermal cameras for outdoor navigation was developed and was able to provide better performance of localization and orientation compared with monocular cases. To further extend capabilities of the thermal-based visual odometry for tasks in complex terrains and to improve local accuracy and global consistency, researchers proposed to fuse position information from the infrared camera and other sensors for trajectory estimation, such as the inertial measurement unit (IMUs), Light Detection and Ranging (LiDAR) and digital camera.

According to various embodiments of the present disclosure, the tracking and mapping system of the present disclosure utilizes an infrared camera for automatic roller path tracking and mapping in pavement construction. The main advantages of using an infrared camera rather than a regular camera include: (i) great adaptation to adverse operating conditions such as the vapor and dust emitted from fresh asphalt, (ii) meeting the requirement of all-day pavement construction since an infrared camera is sensitive to the temperature instead of the illumination, and (iii) being capable of detecting distinctive features in thermal images from hot asphalt pavement surface for visual odometry. Regarding (iii), an unsuccessful application of visual odometry using a regular camera on asphalt terrain can be found in Campbell, J., Sukthankar, R. & Nourbakhsh, I. (2004), Techniques for Evaluating Optical Flow for Visual Odometry in Extreme Terrain, 2004 *IEEE/RSJ International Conference on Intelligent Robots and Systems (IROS)(IEEE Cat. No. 04CH37566)*, IEEE, pp. 3704-3711), which is incorporated by reference herein in its entirety, and in which the features for visual odometry are unstable and the average cumulative error rate reached up to 0.49. Instead, the thermal images captured of hot asphalt pavement can provide reliable boundary geometries and feature points that are associated with cold points across the pavement surface. These will be used as the basic information for visual odometry in the present disclosure.

Calibration and Vision-Based Geometric Parameter Model
Camera Calibration

Camera calibration is of high importance and the primary step in computer vision surveying. It defines the projective relationship between the 3D world scene (object space) and the camera's 2D image plane (image space) In most field implementations, it is practically reasonable to assume a locally planar model in the vicinity of the vehicle while it is traveling on flat ground or road. In this case, the original 3D-to-2D projective mapping can be degraded to 2D homography. As shown in FIG. 1, given a set of scene points on the ground plane 109, which exist within the field of view of the camera 106, their coordinates in the world coordinate system (2D coordinates in this case) can be described in the homogenous form as $M=[X\ Y\ 1]^T$. Then the relationship between the objects and the corresponding homogenous image coordinates $m=[x\ y\ 1]^T$ can be described as $$sm = HM \quad (1)$$

where H is the homography matrix, representing the projective transformation between the image plane 103 and the world plane. Since H is defined up to a scale factor s, namely there are actually eight independent ratios amongst it, it can be determined from at least four image-to-world point correspondences in general condition with the help of the DLT method.

Up until now, the camera model is assumed as an accurate linear model, of which the world point, the corresponding image point, and the optical center of the camera are collinear. However, it may not be true in reality when consumer-grade cameras are applied. The most significant deviation is caused by a lens distortion, especially the radial distortion. This type of error may compromise the accuracy of the camera model in practical applications for displacement estimation. Therefore, a correction process necessitates being performed in order to rectify the distorted image. To do so, a three-step camera calibration process is applied herein. First, the camera intrinsic matrix and the radial distortion coefficients are determined in the laboratory using Zhang's calibration method. Then, the pixel coordinates in the recorded image are corrected by $$\hat{x} = x_c + L(r)(x - x_c)$$
$$\hat{y} = y_c + L(r)(y - y_c) \quad (2)$$

where (x, y) are the measured coordinates, $(\hat{x}, \hat{y})$ are the corrected coordinates, $(x_c, y_c)$ is the center of radial distortion, with $r^2 = (x-x_c)^2 + (y-y_c)^2$. Note that, the principal point is often used as the center for radial distortion.

An approximation to function L(r) is given by $L(r) = 1 + \kappa_1 r + \kappa_2 r^2 + \kappa_3 r^3$ with $\{\kappa_1, \kappa_2, \kappa_3\}$ being the radial distortion coefficients. Finally, the projective matrix can be estimated by $$sm' = H'M \quad (3)$$

where $m' = [\hat{x}\ \hat{y}\ 1]^T$, H' is the optimized projection matrix between the image plane and the world plane after eliminating the effect of lens distortion.

Vision-Based Geometric Parameter Model

Figure 2A:
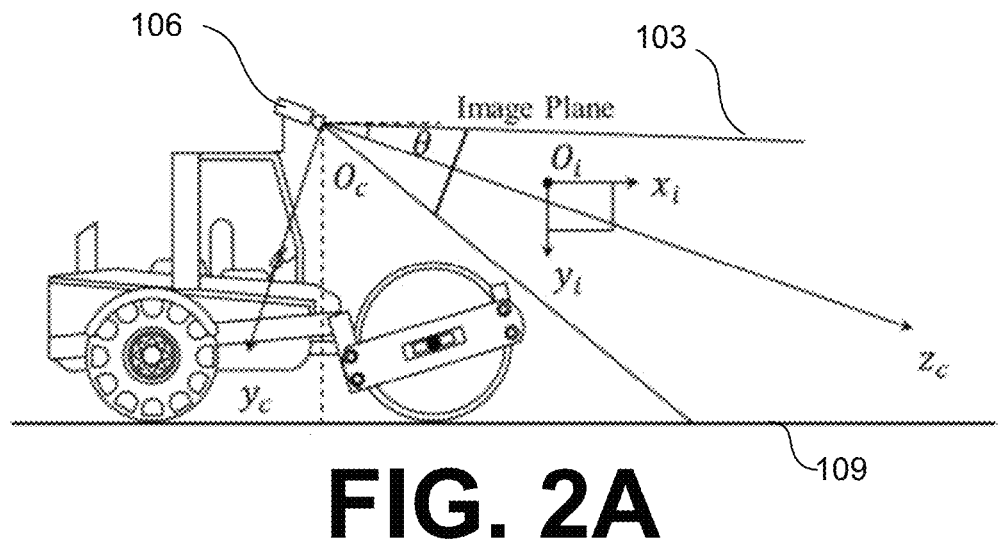
FIGS. 2A and 2B illustrate examples of a vision-based geometric parameter model according to various embodiments of the present disclosure.
Figure 2B:
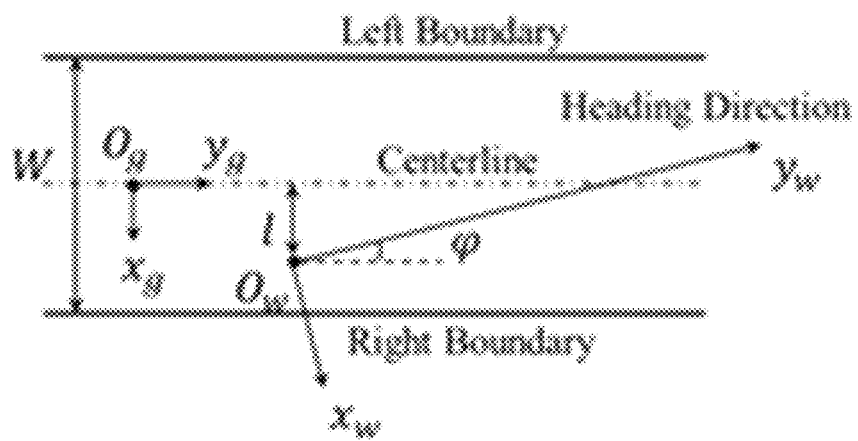

The proposed technological development used a vision-based geometric parameter model, which is depicted in FIGS. 2A and 2B. Within this model, four different coordinate systems are deployed, i.e., 3-D camera coordinate system $(x_c, y_c, z_c)$, 2-D image plane system $(x_i, y_i)$, 2-D world coordinate system $(x_w, y_w)$ and 2-D ground plane system $(x_g, y_g)$. In terms of the camera coordinate system, the origin $O_c$ is located at the projection center of the camera 106, the z axis coincides with the direction of the camera's optical axis, the x axis is properly aligned to the horizontal direction and the y axis is determined from the right-hand rule. The image plane 103 is parallel to the x-y plane of the camera coordinate system and the origin $O_i$ is located at the top-left corner of the image plane 103.

The world coordinate system coincides with the ground plane 109 in correspondence with the roller 203, and its origin $O_w$ is set up directly under the projection center of the camera 106. Besides, its x axis is parallel to the projection line of the camera's optical axis on the ground plane 109, and its y axis is orthogonal to the x axis. Therefore, the world coordinate system remains affixed to the camera 106 while the roller is traveling. Finally, the ground plane system is fixed on the road surface with the origin $O_g$ located at the intersection of the starting position of the roller 203 with the road centerline. Different from the definition of the traditional coordinate system, the y axis of the ground plane system is defined as along the road direction, and the x axis is perpendicular to the y axis. Namely, the direction of the y axis keeps changing with the variation of the road direction. The rest parameters in FIG. 2 are annotated as follows. $\theta$ is the angle between the ground plane and the camera's optical axis; $\varphi$ is the heading direction of roller 203 with respect to the road direction; l is the lateral offset of the roller 203 relative to the centerline; W is the road width.

Methodology

Figure 3:
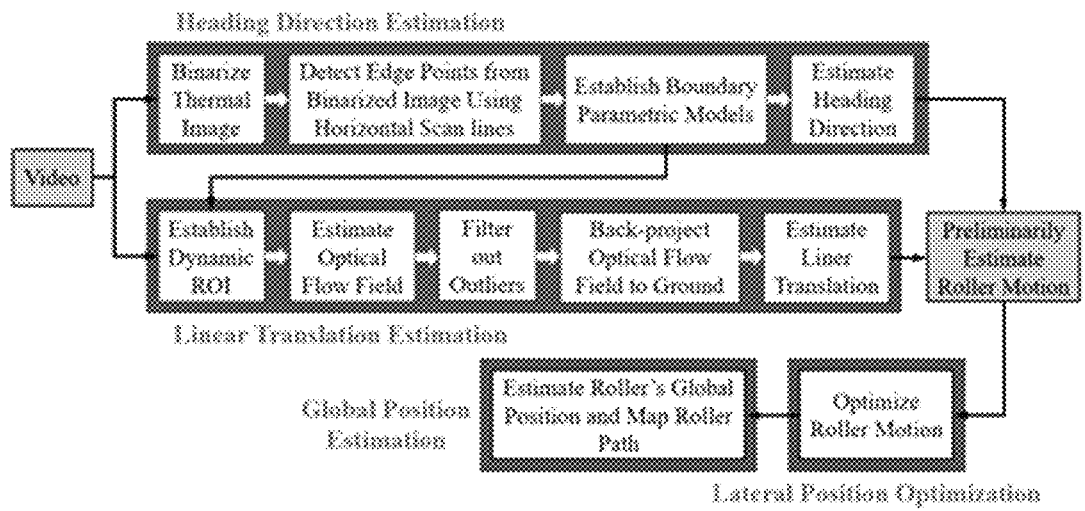
FIG. 3 illustrates an example of a flowchart associated with the roller path tracking and mapping according to various embodiments of the present disclosure.

For roller operations, it is practically reasonable to assume a locally planar model for the pavement surface in the vicinity of the roller 203. Therefore, it is applicable to use the monocular vision for roller path tracking and mapping. For a short time elapsed, it is reasonable to assume that the roller motion can be decomposed into two motion components, i.e., the heading direction and the linear translation. Under this assumption, the overview of the method 300 of the present disclosure is depicted in FIG. 3, according to various embodiments of the present disclosure FIG. 3 illustrates four principal modules: heading direction estimation, linear translation estimation, lateral position optimization, and global position estimation.

First, the roller motion between two consecutive frames is jointly estimated by the heading direction estimation module in reference to pavement boundary information and the translation estimation module using the optical flow technique. Then, the lateral position optimization module is applied to improve the accuracy of the roller's latitudinal position estimation that directly determines the overlap distance between two adjacent rolling passes. Finally, the global position estimation takes place to estimate the roller's global location by chaining frame-by-frame roller motions recursively. In the following, each module is explained in detail.

Heading Direction Estimation

To estimate the roller's heading direction, i.e., $\varphi$ in FIGS. 2A and 2B, a boundary-based approach that contains two main stages is disclosed according to various embodiments. The first stage is using suitable parametric models to describe the pavement boundaries on the image plane. The second stage is estimating the roller's heading direction by leveraging the established boundary parametric models. These two stages are conducted sequentially for each recorded thermal image.

Under normal circumstances, the pavement boundaries can be considered as straight lines within the field of view of the camera 106 and therefore, the single-linear parametric model is sufficient to describe the boundary geometry on the image plane 103. However, this is not always the case when the boundaries are curved, for instance the ring roads, and hence a high-order parametric model is required. In order to fine-tune the process of model fitting for a selected boundary, a conic model combining linear and quadratic polynomial is established, which can be represented as $$ax+by+c+dx^2+exy+fy^2=0 \qquad (4)$$

where (x,y) are the image coordinates of edge points lying on the selected boundary; a, b, c, d, e, f are the coefficients that need to be determined. The fine-tune strategy for boundary fitting is performed as follows. Since the straight road scenes are in majority, a linear model is preferentially established for a selected boundary without considering the coefficient of two-order terms in Eq. 4, i.e., d=e=f=0. When the residual error of the predicted linear model exceeds a specified threshold, which means the roller 203 has entered the curved portion of the pavement, the linear model will automatically switch to the conic model with considering all coefficients in Eq. 4. The next sub-step in the first stage is to extract edge points from the selected boundary for model fitting. To this end, the thermal image is binarized firstly. Thanks to the salient temperature difference between the fresh asphalt pavement surface and the environmental region, which manifests itself as the significant intensity difference in the thermal images, it is pretty easy to specify a suitable threshold for binary image operation.

Figure 4:
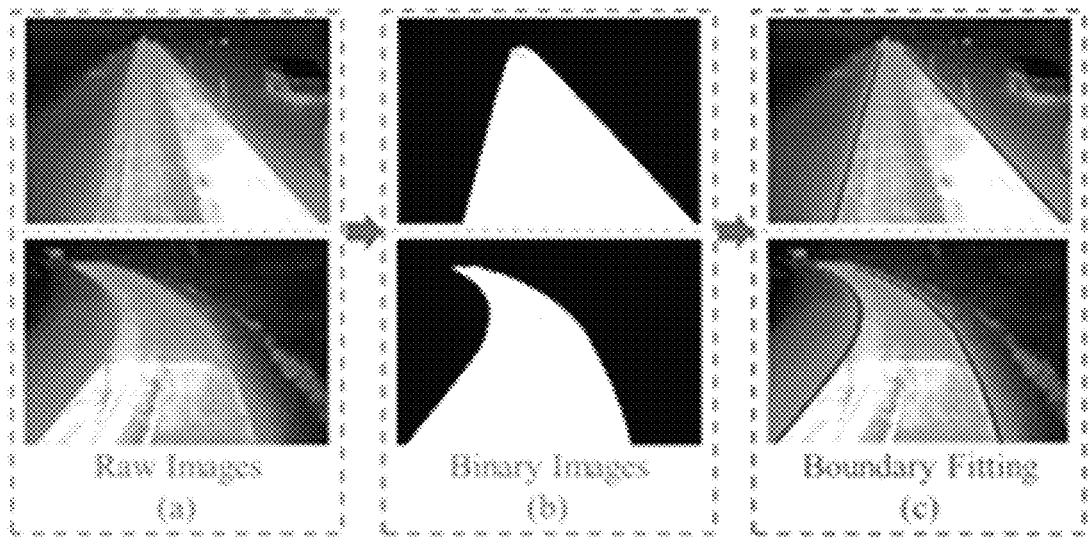
FIG. 4 provides an example diagram that illustrates the regional division from binary operation and boundary fitting results: (a) raw thermal images; (b) binary images and (c) boundary fitting according to various embodiments of the present disclosure.

FIGS. 4(a) and 4(b) show the thermal images of straight and curved pavement scenarios and their ideal binary results, respectively. It can be seen that this fundamental but practically useful operation can not only completely mask undesired features such as trees, cars and objects on the side of the pavement, but also enhance the boundary information even if some boundary segments are visually blurry in the raw thermal images. Afterwards, horizontal scan lines are employed to search the edge points in the binarized images. For each scan line, an edge point can be found at the mutational position of the logical value. As expected, there is one and only one edge point that can be detected from one horizontal scan line at a selected boundary. In the concept of prosperity and performance of a model-fitting process, a dataset containing more valid points will reach a higher accuracy, but at the expense of extra computational cost. After trade-off is made between the accuracy and computational cost, the interval between two adjacent scan lines is set as to 10 pixels. The above process is executed for both boundaries, i.e., left and right, and the results of edge point searching and boundary fitting are plotted to the original thermal images, as shown in FIG. 4(c).

The second stage is to determine the roller's heading direction from the established boundary parametric models. As per the previous definition of the geometric parameter model, the world coordinate system is tied to the camera, indicating that a slant of the roller's heading direction relative to the road direction will render to a change of the boundary slope (or road direction) on the world plane. As such, the boundary slope or road direction on the world plane can be used to inversely identify the roller's heading direction. To this end, the boundary slope is first estimated on the image plane 103.

Figure 5:
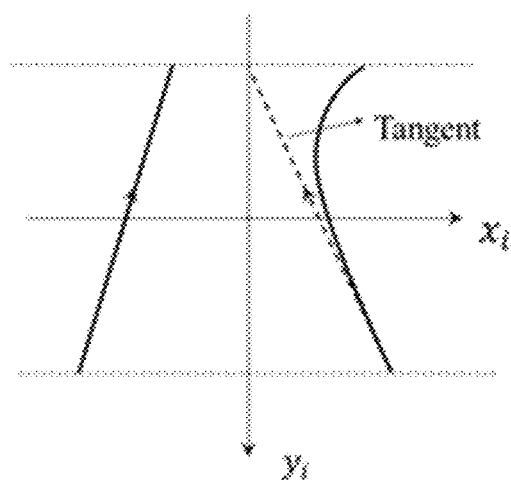
FIG. 5 provides an example of a heading direction estimation of straight and curved boundaries on image plane according to various embodiments of the present disclosure.

As illustrated in FIG. 5, in terms of the straight cases, the boundary slope can be directly derived from the parameters of the boundary models $$\left(\text{i.e. } -\frac{a}{b}\right).$$

However, as for the curved case, the tangents to the curved boundaries next to the roller 203 are needed. For simplicity, the tangents to the curved boundaries at the bottom of the image (that is, the portion of the pavement closest to the roller 203) are derived on the image plane 103 to represent the road direction. Accordingly, the tangents can be modeled as ax+by+c=0, which is similar to the straight boundary cases. Subsequently, the parameters of the boundary slope are back-projected onto the world plane, which can be obtained as $$l'=H^T l \qquad (5)$$

where l=[a b c]$^T$ and l'=[a' b' c']$^T$. Once the boundary slope on the world plane is identified from either straight or curved case, the roller's heading direction can be determined as $$\varphi = \begin{cases} -\frac{\pi}{2} + \arctan\left(-\frac{a'}{b'}\right), & \frac{a'}{b'} \leq 0 \\ \frac{\pi}{2} + \arctan\left(-\frac{a'}{b'}\right), & \frac{a'}{b'} > 0 \end{cases} \qquad (6)$$

where arctan(•) is the inverse trigonometric function.

It is worth noting that, if φ is positive (negative), the heading direction is toward the right-hand (left-hand) side. As a rule, one can achieve the goal of heading direction estimation by using only one boundary because the heading direction identified from the left and right boundaries are theoretically identical. To attenuate the effect from the measurement error, the registered roller's heading direction is finally determined as $$\overline{\varphi}=\tfrac{1}{2}(\varphi_l+\varphi_r) \qquad (7)$$

where $\varphi_l$ and $\varphi_r$ are the roller's heading direction estimated from the left and right boundaries, respectively.

Linear Translation Estimation

To estimate the roller translation, the optical flow technique was employed. The optical flow technique is a computer vision method, which allows for determining two-dimensional motion between a sequence of frames from an estimation of spatial and temporal derivations of the brightness pattern of objects on the image plane 103. Building upon two basic assumptions, namely brightness constancy and small motion, the underlying principle of the optical flow technique can be modeled as $$I(x,y,t)=I(x+\Delta x,y+\Delta y,t+\Delta t) \qquad (8)$$

where (x,y) is the location of one tracking pixel at time t; Δx and Δy are the displacement of this pixel along two directions at a time elapsed of Δt; I is the intensity function. Taking Taylor expansion of I(x+Δx,y+Δy,t+Δt) at (x,y,t) to linearize the right side of Eq. 8, one can get the following equation $$I(x+\Delta x, y+\Delta y, t+\Delta t) \approx I(x, y, t) + \frac{\partial I}{\partial x}\Delta x + \frac{\partial I}{\partial y}\Delta y + \frac{\partial I}{\partial t}\Delta t \qquad (9)$$

Substituting Eq. 9 into Eq. 8 and dividing by Δt yields $$\frac{\partial I}{\partial x}\frac{\Delta x}{\Delta t} + \frac{\partial I}{\partial y}\frac{\Delta y}{\Delta t} + \frac{\partial I}{\partial t} = 0 \quad (10)$$

Or more concisely $$\nabla I \cdot \vec{V} + I_t = 0 \quad (11)$$

Eq. 11 is called optical flow equation with $$\nabla I = [I_x \ I_y] = \left[\frac{\partial I}{\partial x} \ \frac{\partial I}{\partial y}\right], \vec{V} = [u \ v]^T = \left[\frac{\Delta x}{\Delta t} \ \frac{\Delta y}{\Delta t}\right]^T \text{ and } I_t = \frac{\partial I}{\partial t}.$$

$\nabla I$ and $I_t$ respectively correspond to the partial derivations of the image intensity I in terms of pixel position (x,y) and time t, which can be determined from the time series of image motion, while $\vec{V}$ is referred to as the optical flow vector that needs to be solved.

It has to mention that the information from a pixel is not sufficient to mathematically solve the optical flow equation with two unknown variables. However, by introducing another constraint, i.e., spatial coherence, it can overcome the inherent ambiguity in optical flow equation and makes this equation solvable. The spatial coherence refers to a constraint that the displacements of a selected pixel's neighbors are essentially constant. Under this condition, the optical flow equation derived from each pixel in the selected window can be concatenated as $$\begin{bmatrix} I_x(q_1) & I_y(q_1) \\ I_x(q_2) & I_y(q_2) \\ \vdots & \vdots \\ I_x(q_i) & I_y(q_i) \end{bmatrix} \begin{bmatrix} u \\ v \end{bmatrix} = -\begin{bmatrix} I_t(q_1) \\ I_t(q_2) \\ \vdots \\ I_t(q_i) \end{bmatrix} \quad (12)$$

$$(Ad = B)$$

where $q_1, q_2, \ldots q_i$, are the pixels inside the selected window of the image. Normally, the window size is set to 21×21, and the same applies to this study. It can be found that Eq. 12 is over-determined owing to having more equations than unknowns. Therefore, the solution can be obtained according to the least squares principle as described below $$\begin{bmatrix} u \\ v \end{bmatrix} = \begin{bmatrix} \sum_i I_x(q_i)^2 & \sum_i I_x(q_i)I_y(q_i) \\ \sum_i I_y(q_i)I_x(q_i) & \sum_i I_y(q_i)^2 \end{bmatrix}^{-1} \begin{bmatrix} -\sum_i I_x(q_i)I_t(q_i) \\ -\sum_i I_y(q_i)I_t(q_i) \end{bmatrix} \quad (13)$$

$$(d = (A^T A)^{-1} A^T B)$$

Note that the matrix $A^T A$ is a Hessian matrix that represents the structure tensor of the image at the central pixel of the selected window. To avoid noise issues and the aperture problem, the two eigenvalues identified from the Hessian matrix are expected to be large enough. In this regard, the corner points or key points are thought of as the best features in the Lucas-Kanade method. In light of this, the Lucas-Kanade method coupled with a corner detector is adopted in this study for translation estimation. Therefore, there are two main steps involved in the adopted optical flow method. The first step is feature extraction, a process of detecting distinctive feature points from the reference image to be tracked. The second step is feature tracking, whose purpose is to trace the selected feature points through the subsequent frames.

For selecting feature points to be tracked, the Shi-Tomasi corner detector was applied, which works well with the Lucas-Kanade method. Since the thermal images are the visual displays of the temperature status of objects, the ideal features for tracking herein will be the cold points across the pavement surface. The cold points are formed because of the local temperature difference across the pavement surface, which manifests themselves as the distinctive points with relatively low intensity in thermal images. Reliability evaluation of feature points in thermal-infrared modality shows that setting a lower sensitive threshold compared to the visual spectrum facilitates gaining of satisfactory feature points in the thermal image. In order to filter the bad feature points along with the necessity of minimizing the processing time, region of interest (ROI) is selected in the thermal images. In the case of the infrared-camera implementation in pavement construction, the outliners mainly derive from the low-quality texture in the distant region of thermal images and the external feature points belonging to traffics or human bodies.

With the above considerations, the pavement surface in the near region of thermal image is a sensible choice for ROI establishment. To this end, a dynamic ROI is specified with the help of the two identified pavement boundaries and a horizontal line in the thermal image, then only the feature points within this region are detected for further analysis. Note that, the position of the specified horizontal line depends on the pitch angle of the camera. Here, the feature points extracted from the reference frame may disappear in the next frames due to the camera movement. To achieve reliable translation tracking, a redetection of feature points is triggered automatically with the use of the Shi-Tomasi corner detector once the number of feature points survived in the current frame less than a specified threshold, defined as 100 in this study, and new feature points are added to the pool of feature points for tracking.

After the feature points are successfully extracted from the reference frame, the Lucas-Kanade method is used to estimate the frame-wise changes in the motion of the selected feature points. It is worth noting that, in order to make the proposed translation tracker resistant to the high noise in the thermal image, a weighted version of Lucas-Kanade method is disclosed in the present disclosure, which can be expressed as $$\begin{bmatrix} u \\ v \end{bmatrix} = \begin{bmatrix} \sum_i \omega_i I_x(q_i)^2 & \sum_i \omega_i I_x(q_i)I_y(q_i) \\ \sum_i \omega_i I_y(q_i)I_x(q_i) & \sum_i \omega_i I_y(q_i)^2 \end{bmatrix}^{-1} \begin{bmatrix} -\sum_i \omega_i I_x(q_i)I_t(q_i) \\ -\sum_i \omega_i I_y(q_i)I_t(q_i) \end{bmatrix} \quad (14)$$

To calculate the weight coefficient $\omega_i$, both the distance $d_i$ and brightness difference $\Delta I_i$ between the pixel $q_i$ and the central pixel in the selected window should be calculated. The weight function has the following form $$\omega_i = \exp\left(\frac{\Delta I_i^2}{2\delta_b^2} + \frac{d_i^2}{2\delta_d^2}\right) \quad (15)$$

where $\delta_b$ and $\delta_d$ are the variances of normal distribution that need to be manually defined. Using the weighted Lucas-Kanade method, the optical flow vector field in correspondence of feature points can be established in the interval of two consecutive frames recursively. Unfortunately, although the selected features have been preliminarily purified by establishing an ROI, there may still exist some samples showing inconsistency with the dominant geometric translation. These erratic optical flow components are mainly attributed to the water vapor in the pavement jobsites, which may contaminate the optical flow vector field and consequently compromise the accuracy of translation estimation.

As stated above, it is reasonable to assume camera movement as a linear translation over a short time elapsed. Therefore, the smoothness can be used as a practical heuristic to test the reliability of each component in the optical flow vector field and to further prune the outlines. With this in mind, the Maximum Likelihood Estimation Sample Consensus (MLESAC) modeling fitting method is utilized to find the outliers.

Figure 6:
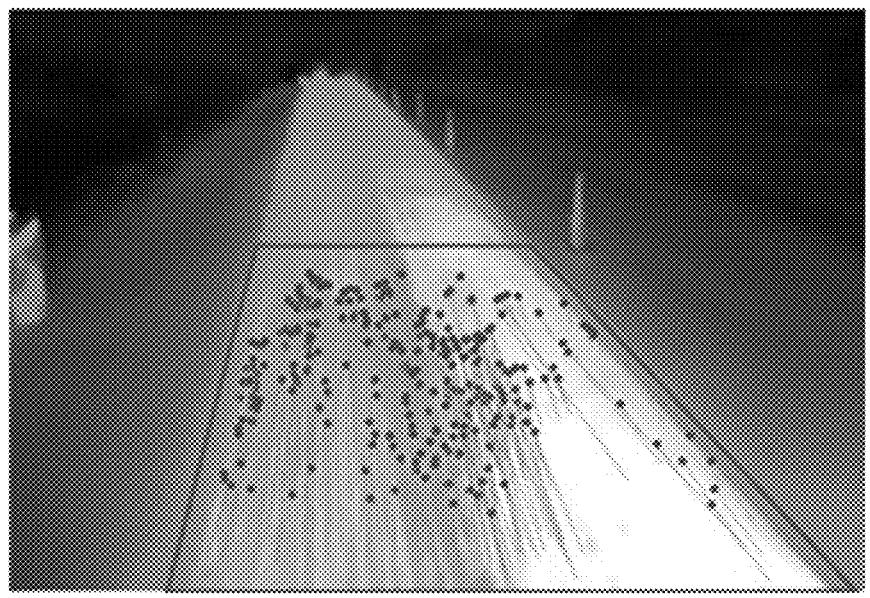
FIG. 6 provides an example diagram of an optical flow field and a region of interest (ROI) establishment according to various embodiments of the present disclosure.

Also, a corner quality level is carefully specified while calculating the minimum eigenvalue of the Hessian matrix (spatial gradient matrix) in the optical flow equation. The corner quality level is a value between 0 and 1, which denotes the minimum quality of corner below which one is rejected. Any feature's minimum eigenvalue does not meet the threshold is rejected and the corresponding component in the optical flow vector field is filtered out. The rejected feature points will be removed from the current frame and not processed in subsequent frames. FIG. 6 shows an example of optical flow vector field between consecutive thermal images as well as the result of ROI establishment.

Afterwards, the displacement vector field can be inversely calculated from the optical flow vector field according to the projective relationship between the image plane 103 and the world space. Among the displacement vector field, each component is the candidate that corresponds to the roller's relative translation over the pavement surface between two consecutive frames. To further mitigate the impact of measurement noise, the registered camera translation is finally determined by taking the average of all translation candidates, which can be expressed as $$T = \frac{1}{n}\sum_{k=1}^{n}(x_k^2 + y_k^2)^{1/2} \quad (16)$$

where T is the relative roller translation between two consecutive frames; n is the number of components in displacement vector; $x_k$ and $y_k$ are the 2-D components of displacement vector with respect to the kth feature point.

Lateral Position Optimization

Figure 7:
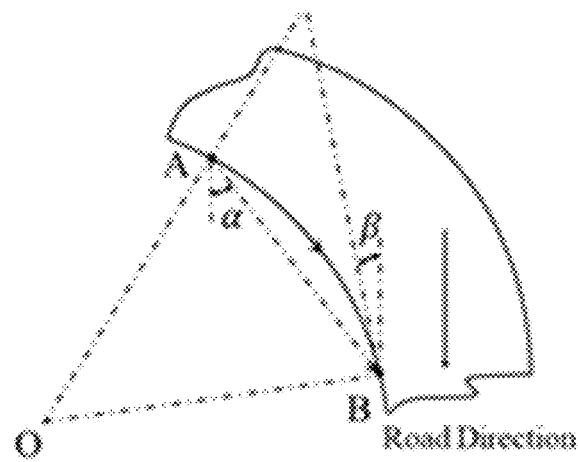
FIG. 7 is an example of path shifting with a certain curvature according to various embodiments of the present disclosure.

Leveraging the translation assumption to estimate the roller position is practically applicable and effective since the employed features are always available in the driving scenarios. However, the disadvantage behind this assumption is that it will inevitably induce a systematic error if the roller trajectory is a curve, especially in the case when the roller 203 makes a path shifting with a small radius. As depicted in FIG. 7, when the roller 203 makes a path shifting from Point A to Point B along a curve of which the center O is on the right-hand side of the heading direction, the actual relative translation between these two points is the length AB and the actual heading direction of the roller is α. Under the translation assumption made in the present disclosure, the registered relative translation is the same as the actual one whereas the registered heading direction becomes β which is slightly smaller than the actual value α. Once decomposing the registered translation into two directions with the use of the smaller heading direction, the lateral component would be slightly smaller than the actual value whereas the longitudinal component would be slightly larger than the actual value. There is no doubt that it would reach the opposite conclusion if the center of curvature is on the left-hand side of the heading direction. Note that the change of the heading direction is normally small when the roller 203 makes a path shifting between two consecutive frames. Therefore, the translation error along the lateral error would be more significant than that along the longitudinal direction. Furthermore, the systematic error may be accumulated after a long time of operations because the roller position in the current frame is completely based on that in the previous frame. On the other hand, the camera calibration error and measurement noise are the other two types of error sources that may be also accumulated and impact the accuracy of the roller position estimation. For pavement compaction, the roller's latitudinal position is a comparatively essential parameter compared with the longitudinal position for quality control, which directly determines the overlap distance between two adjacent rolling stripes. To improve the accuracy of the roller's lateral position estimation, a lateral position optimization module is proposed herein.

Figure 8:
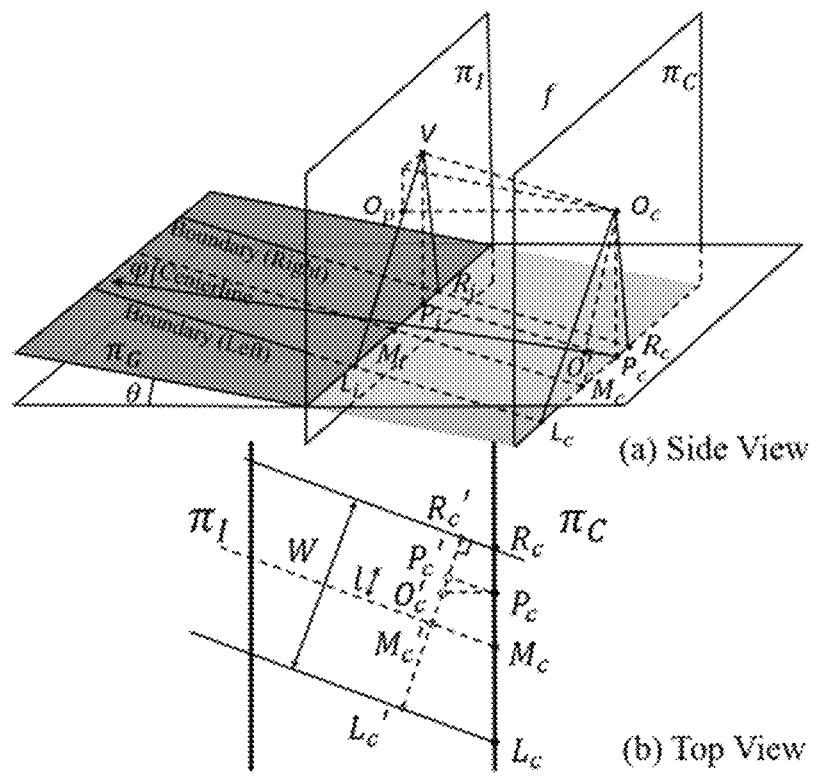
FIG. 8 is an example of a geometric model for position optimization according to various embodiments of the present disclosure.

FIG. 8 depicts a geometric model for position optimization associated with the vision-based geometric parameter model in FIGS. 2A and 2B. The image plane 103 and the ground plane are annotated as $\pi_I$ and $\pi_G$, respectively. The plane $\pi_C$ through $O_c$ is parallel to the image plane 103 $\pi_I$. $L_lL_c$ and $R_lR_c$ correspond to the two parallel boundaries on the ground plane, and $M_lM_c$ is the road centerline. Let V stand for the vanishing point that corresponds to the intersection of two imaged boundaries $VL_i$ and $VR_i$ on the image plane 103.

According to the projective geometry, the vanishing point is the image of the point at infinity where a pencil of parallel lines coverage in the three-dimensional space, thus the ray starts from the optical center of the camera passing the vanishing point can be thought of as the direction indicator of these parallel lines. Based on this, one can easily yield that $VO_c$, $L_lL_c$, $M_lM_c$ and $R_lR_c$ are parallel to each other. It hence can be further inferred that $VL_i$ and $VR_i$ are parallel to $O_cL_c$ and $O_cR_c$, respectively. Now, construct a perpendicular line passing V for $L_iR_i$, and denote the intersection as $P_i$. A similar process is performed in terms of $O_c$ and $L_cR_c$, and the corresponding intersection is denoted as $P_c$. Then, project the optical center of the camera $O_c$ onto the ground plane $\pi_G$ and denote the projection point as $O_c'$. Note that the point $O_c'$ represents the roller location (or better, camera location) on the ground plane. Therefore, $O_cO_c'$ is the distance between the camera and the ground plane, and denoted as D. Based on the above specifications, one can effortlessly derive the equations as $$a_l = \frac{VP_i}{L_iP_i} = \frac{O_cP_c}{L_cP_c}, a_r = -\frac{VP_i}{P_iR_i} = -\frac{O_cP_c}{P_cR_c} \quad (17)$$

where $a_l$ and $a_r$ are slopes of left boundary and right boundary on the image plane, respectively. Since the point $M_c$ is located on the road centerline, it means that $M_cL_c=M_cR_c=\frac{1}{2}L_cR_c$. Substituting this equation into Eq. 17 generates $$a_l = \frac{2 \cdot O_c P_c}{L_c R_c + 2 \cdot M_c P_c}, a_r = -\frac{2 \cdot O_c P_c}{L_c R_c - 2 \cdot M_c P_c} \quad (18)$$

These two equations can be solved as $$M_c P_c = \frac{a_l + a_r}{2(a_r - a_l)} L_c R_c \quad (19)$$

As shown in the top view plot of FIG. 8, the distance ratios between $R_c'P_c'$, $P_c'M_c'$ and $M_c'L_c'$ are same as those between $R_c P_c$, $P_c M_c$ and $M_c L_c$ according to the basic trigonometry, thus one can obtain $$P_c'M_c' = \frac{a_l + a_r}{2(a_r - a_l)} W \quad (20)$$

Similarly, the distance $P_c'O_c'$ is given by $$P_c'O_c' = \sin \varphi \cdot \tan \theta \cdot D \quad (21)$$

with $$\sin \varphi = \frac{v_x - u_x}{\sqrt{(v_x - u_x)^2 - (v_y - u_y)^2 + f^2}} \quad (22)$$

$$\tan \theta = \frac{v_y - u_y}{f} \quad (23)$$

where $(u_x, u_y)$ is the coordinate of the principal point $O_p$; $(v_x, v_y)$ is the coordinate of the vanishing point V. Then the distance of the roller 203 departing from the road centerline can be determined as $$l = P_c'M_c' - P_c'O_c' = \frac{a_l + a_r}{2(a_r - a_l)} W - \sin \varphi \cdot \tan \theta \cdot D \quad (24)$$

A similar result holds for curved boundaries while taking into account of their tangent lines. It is necessary to point out that, if l is positive (negative), the roller position is on the right-hand (left-hand) side of the road relative to the heading direction. According to Eq. 24, it is indicated that the lateral offset of the roller relative to the road centerline is geometrically based on the camera intrinsic parameters, image plane parameters (i.e., the slopes of the imaged boundaries and the location of vanishing point), and two extra physical parameters (i.e. the road width and the height of the camera above the ground plane). In terms of the height of the camera 106, it can be manually measured after the camera installation and keeps stable during the rolling process. As for the road width, it refers to the constructing pavement width, which is a fixed value and supposed to be known after the asphalt paving procedure.

Up to this point, there are two measurements about the lateral offset of the roller 203 relative to the road centerline, which are separately identified from each frame. The first one is obtained from the cumulative lateral position of the roller 203 using the estimated translation and heading direction, while the second one is based on the geometric model of the framing system. To improve the accuracy level of lateral position estimation, these two independent lateral position information are fused via the Extended Kalman Filter (EKF), and the optimal roller lateral position can be obtained at each frame recursively.

Global Position Estimation

Based on the relative motion derived earlier, the incremental changes in the roller position can be estimated by chaining the frame-by-frame motions recursively. The roller's global position relative to the starting position on the ground plane system can then be estimated. It is noteworthy that the definition of the ground plane system in this the present disclosure is different from that of the traditional one, whose ordinate keeps changing with the variation of the road direction. Therefore, the roller's global position is connected to the pavement trend. For pavement compaction, the priority that one should take is the roller position relative to the road centerline or boundaries and the position along the road direction rather than the geographic position on the terrain surface. With such definition of roller's global position, it greatly improves the connection between the roller and the pavement, hence allowing the roller operator to have an intuitive judgment of the roller position on the pavement surface in order to precisely adjust the compaction operations to ensure higher quality pavement performance.

Prototype Development and Validation

Prototype Development

A prototype was developed to test the performance of the method of the present disclosure. The specification of the hardware used in the developed prototype is tabulated in Table 1.

TABLE 1

Performance specification of hardware adopted in developed prototype

| Component | Model | Performance Specification |
| --- | --- | --- |
| Infrared Camera | PathFindIR Camera | Spectral Band: 8-14 m<br>Field of View: 24° h × 18° v<br>Resolution: 704 × 480 pixels<br>Focal Length: 19 mm<br>Maximum Frame Rate: 30 fps |
| Laptop Computer | ThinkPad X1 Carbon | Processor: Intel ® Core ™ i5-10210U Processor @1.80 GHz<br>Memory: 16 GB<br>Display Type: 14.0"<br>(1920 × 1080) |
| Digital Video Recorder | Observer ™ 4100 | Integrated GPS, Wi-Fi, and Ethernet<br>H.264 Video Compression Format<br>Forward-facing RCA Port for Live Viewing on External Monitor |
| Video Monitor | SV-LCD70RP | LCD System: 7-inch Resolution: 1400 (RGB) |

The infrared camera PathFindIR was used for thermal image acquisition with a coupled lens whose focal length is 19 mm. The frame resolution was 704×480 and the maximum sampling rate was 30 fps. This type of infrared camera has an industrial design that allows for use in harsh environments, such as smog, vapor and rain, thus making it practical for long term deployment in pavement construction. The raw thermal videos were recorded in "AVC" format and streamed to the digital video recorder Observer™ 4100 for data storage, which is designed to withstand the demanding shock and vibration requirements of in-vehicle recording. Combined with the built-in Wi-Fi and Ethernet, the Observer™ 4100 also enables the video stream to be directly read and transmitted from the infrared camera to a laptop. The video monitor displays the raw thermal video from the digital video recorder via the wired connection, which provides the user with real-time feedback during the installation and thus helps to find an optimal field of view of the camera.

The software for roller path tracking and mapping was developed in the programming environment Visual Studio 2015 using C++ language with OpenCV library. The developed software is capable of converting various video formats into an "avi" format from which the thermal frames can be easily extracted in various formats such "jpg" and "png". It is noteworthy that the developed software not only can allow the user to browse the folder and import the recorded thermal files to the software for post-processing but also can directly read the video stream from the digital video recorded via the wireless connection, making it potential for use in real-time roller path tracking and mapping during pavement compaction.

Figure 9:
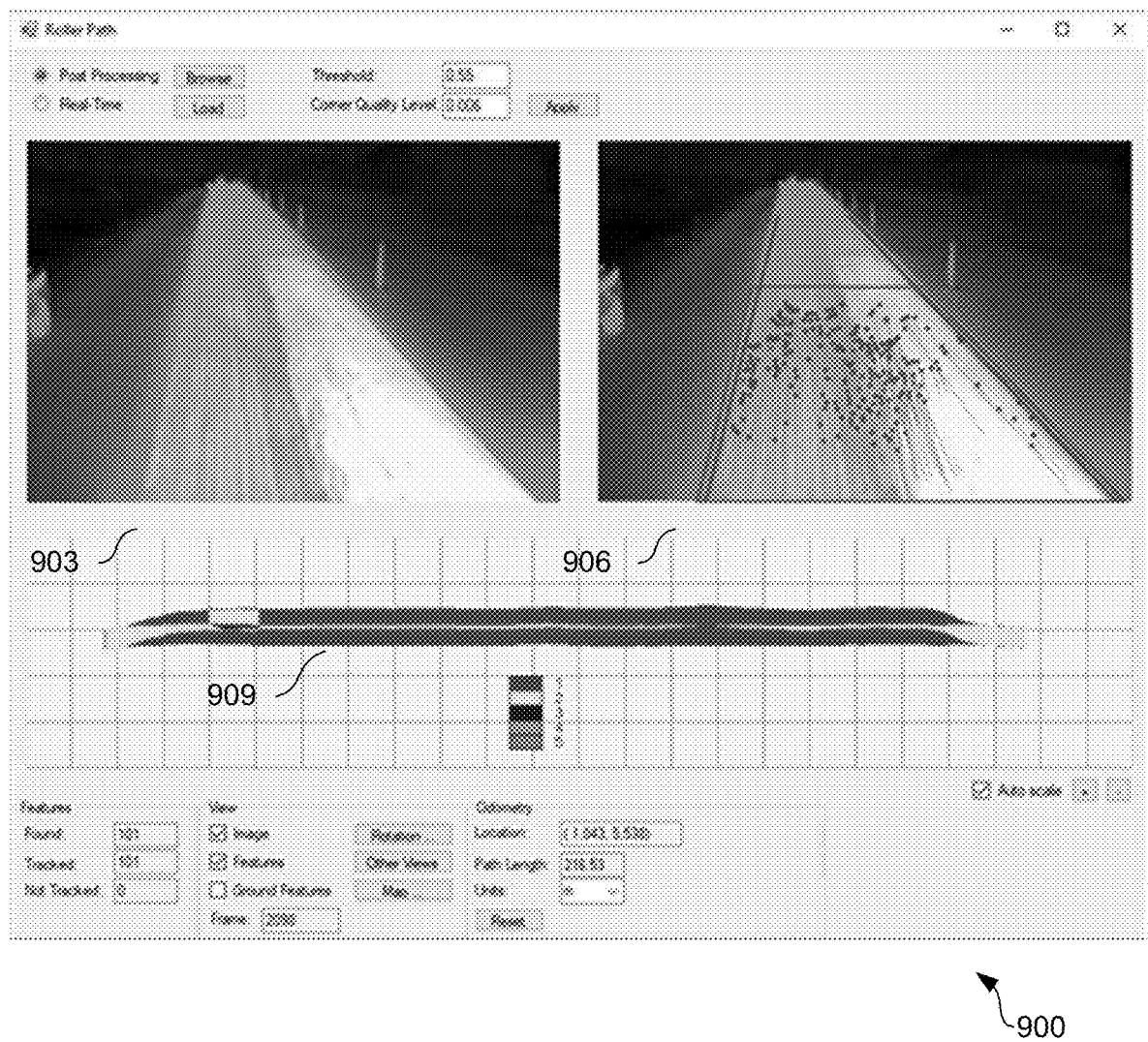
FIG. 9 is an example of a user interface displaying a representation of the tracking and mapping data according to various embodiments of the present disclosure.

FIG. 9 shows a user interface 900 that can be rendered on a display device according to various embodiments. In particular, the user interface 900 illustrates the tracking of the roller position in videos, according to various embodiments of the present disclosure. The top-left plot 903 shows the raw thermal video captured by the infrared camera 106. The top-right plot 906 shows the intermediate processing results such as boundary fitting, ROI establishment and optical flow field. Such plot allows the user to gain intuitive understanding of the performance of the developed method in real time. The bottom plot 909 presents the resulting passes and color-coded rolling paths, in which the different color corresponds to the different number of passes in the same path of the pavement. With the help of the color-coded rolling paths, the roller operator can timely adjust compaction efforts to achieve a more uniform rolling pattern and high-quality performance. Also, FIG. 9 presents the real-time roller position information, such as the global position relative to the starting location and the total traveling distance.

Laboratory Validation

Figure 10:
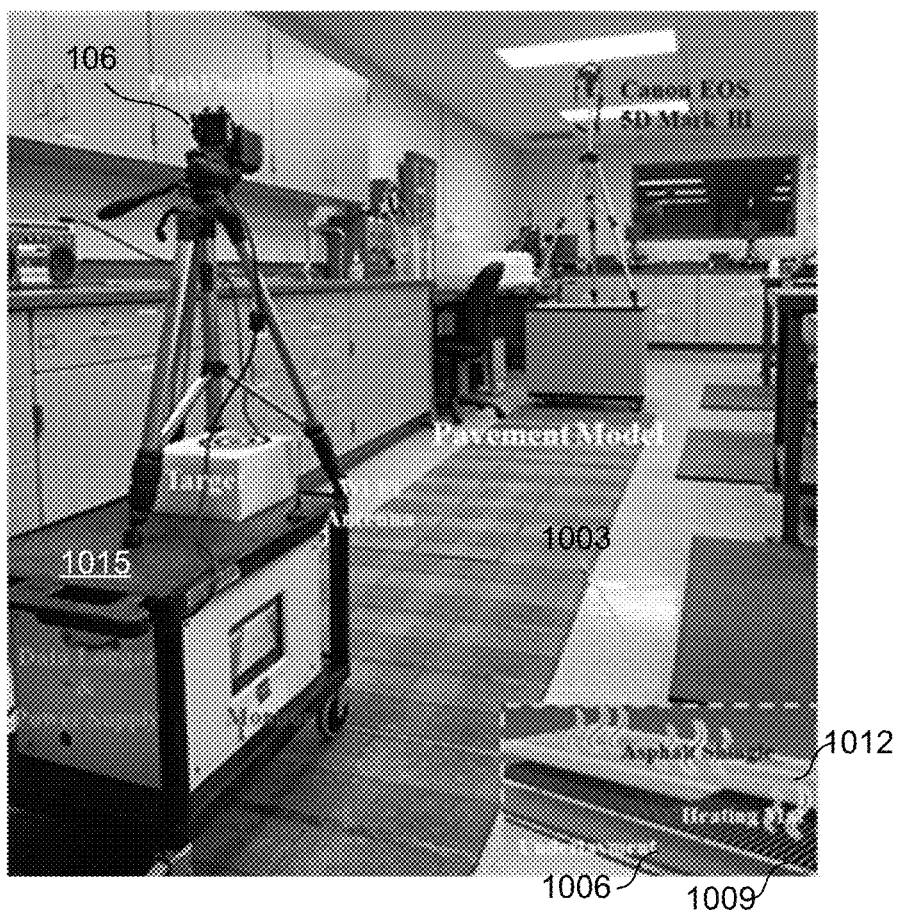
FIG. 10 is an example of a schematic overview of an experimental setup according to various embodiments of the present disclosure.
Figure 11:
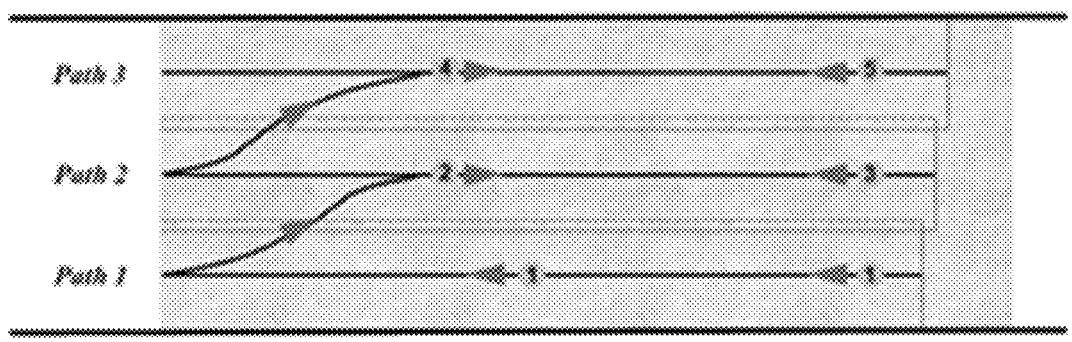
FIG. 11 is an example of a designed rolling pattern that contains three passes and five movements to uniformly cover pavement model in accordance to various embodiments of the present disclosure.

The performance of the proposed prototype was experimentally evaluated on a pavement model in a laboratory at West Virginia University. Restricted by the available equipment, only the case of straight pavement boundary was considered in the laboratory validation. FIG. 10 shows the schematic overview of the experimental setup. One straight pavement model 1003 was built to simulate a typical asphalt pavement, whose assembly consists of three layers. The surface layer 1012 of the pavement model was constructed out of 3-tab asphalt shingles that are made of organic fiber felt impregnated with asphalt. A gentle electric radiant heating mat was arranged at the base layer 1009, capable of providing consistent heat continuously after self-heating. The soft underlayment was placed on the subbase layer 1012, functioning primarily as a thermal insulation layer and also protecting the heating mat for safety purposes. The width and length of the pavement model was 91.4 cm (3 ft)×365.76 cm (12 ft), and the thickness was about 3 mm (0.12 inch). A rolling pattern composed of three roller passes and five movements over the road surface was designed, as represented in FIG. 11.

To guarantee the pavement model scenario always available in the field of view of the infrared camera for feature detection and tracking, the length of each rolling path was defined to around 225 cm. The experiments were conducted inside the laboratory with a stable indoor air temperature of 20° C. controlled by the air conditioner. Under this environmental condition, the pavement surface would reach a thermal equilibrium state with a temperature of 30° C. after the self-heating of the heating mat.

The prototype was installed on a cart 1015 to simulate an IC roller for pavement compaction, as also shown in FIG. 10. The infrared camera 106 was mounted on a tripod, and the camera intrinsic parameters and the radial distortion coefficients had been previously obtained, as summarized in Table 2.

TABLE 2

Intrinsic parameters and radial distortion coefficients of infrared camera

| Intrinsic Parameters | Principal (Pixel) $u_x$ | Point $u_y$ | Focal Length (Pixel) $f$ | Radial Coefficient | | Distortion |
|---|---|---|---|---|---|---|
| | | | | $\kappa_1$ | $\kappa_2$ | $\kappa_3$ |
| Laboratory Testing | 342.405 | 247.472 | 1549.874 | 0.137 | 0.060 | 0.085 |
| Field Testing | 349.837 | 253.783 | 1568.191 | 0.153 | 0.082 | 0.364 |

Figure 12:
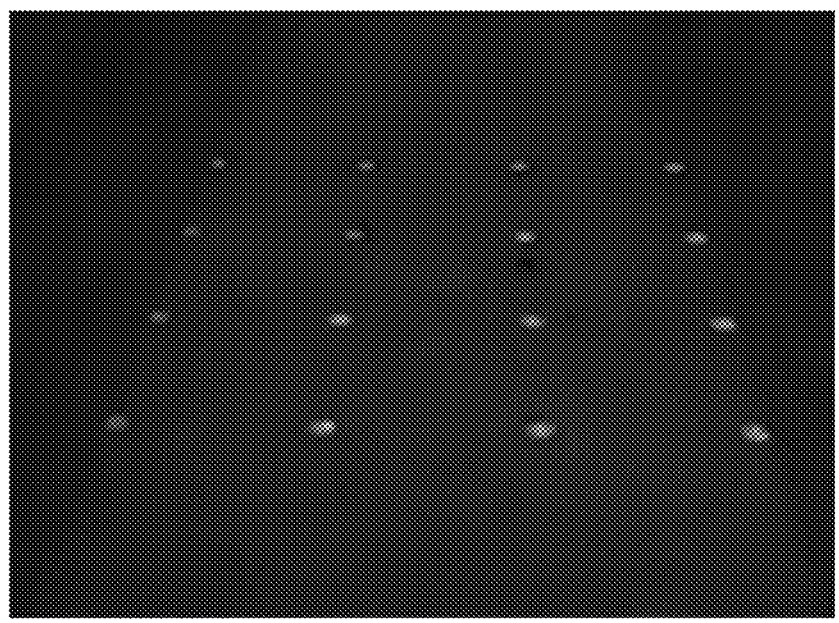
FIG. 12 is an example of a calibration pattern for camera calibration in laboratory testing in accordance to various embodiments of the present disclosure.

The tripod was carefully fixed on the roof of the cart 1015 to guarantee that the infrared camera 106 was set up directly over the axial center of two rear wheels of the cart. By doing so, the measured camera position can be authoritatively represented as the corresponding position of the cart (simulated roller 203). The infrared camera 106 was inclined appropriately to seek a satisfactory field of view for feature detection and tracking. The height of the infrared camera 106 off the ground plane was 1.46 m. After camera pose adjustment, the camera calibration followed, and a calibration pattern 1203 consisting of sixteen (16) heated circular steel plates, arranged in a 4×4 matrix, was employed to establish the projective relationship between the thermal image plane and the road surface, as presented in FIG. 12. The recorded thermal video files initially stored in the SD card of the digital video recorder and then copied to the laptop for postprocessing to extract camera trajectories. The sampling rate was set as 15 Hz.

To test the performance of the implemented prototype, the actual position and trajectory of the cart 1015 (or the infrared camera 106) during the rolling process were necessarily needed. To this end, a Canon® EOS 5D Mark III camera equipped with a 35-mm prime lens was employed to gain ground-truth trajectories of the camera 106 during the entire experimental procedure, as also shown in FIG. 10. The frame rate was set to 6 Hz and the image resolution was 5760×3840 pixel. The lens distortion of Canon® camera can be neglected due to its high level of craftsmanship. The Canon® camera was adjusted facing the pavement to ensure that the entire testing scenario existed in all frames of the recorded video.

One artificial target with a diffuse concentric ring pattern was horizontally attached below the infrared camera 106, and the centroid of this tracking pattern (i.e., the coincide center of concentric circles) called tracking centroid was used for the visual tracking to obtain the actual position of the cart 1015 (or the infrared camera 106) during the rolling process. Owing to the projective distortion, the circles appear with ellipsoidal patterns on the image plane 103. Therefore, the coordinates of the tracking centroid on the image plane 103 could be determined from the estimation of the coincide center of the concentric ellipse by leveraging the ellipse fitting algorithm.

Figure 13:
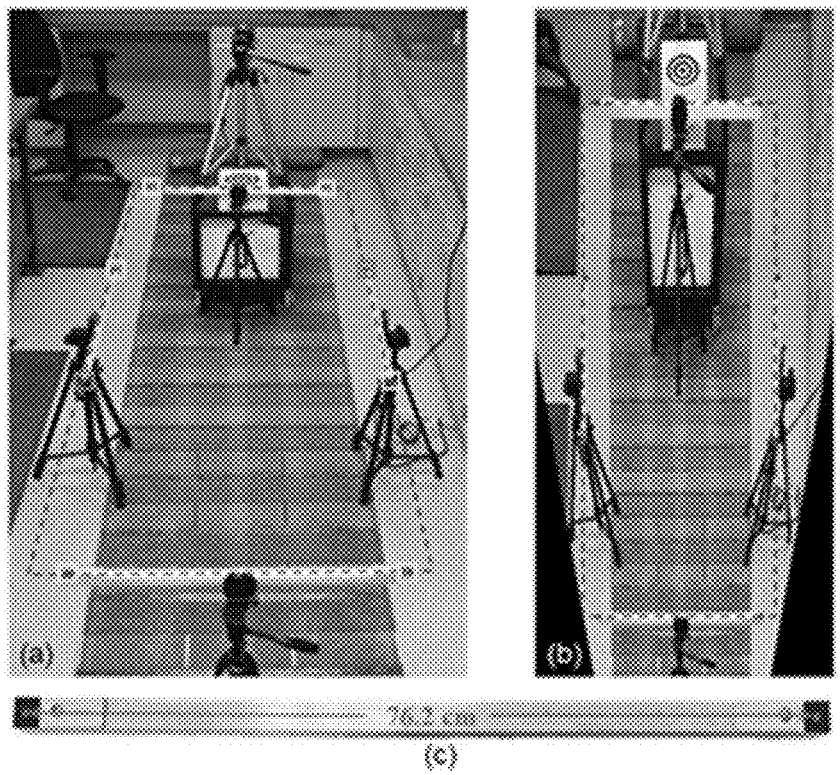
FIG. 13 is an example of a movement plane of tracking pattern and calibration bars: (a) constructed movement plane; (b) corrected movement plane after removing projective distortion and (c) calibration bar in accordance to various embodiments of the present disclosure.

It can be effortlessly envisioned that the trajectory of the tracking centroid was constrained within a suspended plane called the movement plane that was parallel to the road surface while the cart 1015 was traveling. Therefore, the physical location of the tracking centroid on the movement plane could be conversely calculated from its image coordinates by means of camera calibration to establish the projective relationship between the movement plane and the image plane. To facilitate the camera calibration, four highly precision calibration bars were employed and arranged to construct a visible movement plane of tracking pattern, as depicted in FIG. 13(a). Each calibration bar has two distinct circle targets with a known distance of 76.2 cm (30 inch) as illustrated in FIG. 13(c), which was rigidly mounted on a tripod and then carefully adjusted to the same elevation as the tracking pattern. After that, the total station was employed to accurately estimate the physical coordinates of these eight calibration targets. Six of the calibration targets (marked by yellow rectangle) were randomly chosen for camera calibration, whereas the remaining two (marked by blue rectangle) were used for validation. The rectified movement plane after projective transformation is shown in FIG. 13(b), in which the reprojection performance could be partially validated as the ellipsoidal rings on the image plane were successfully corrected to the circular ones. Furthermore, the reprojection errors (Euclidean distance) with respect to the two targets for validation were 0.248 mm and 0.257 mm respectively, indicating that the position measurements from the Canon® camera are reliable and accurate and thus can be used to generate ground truths in this study.

Figure 14:
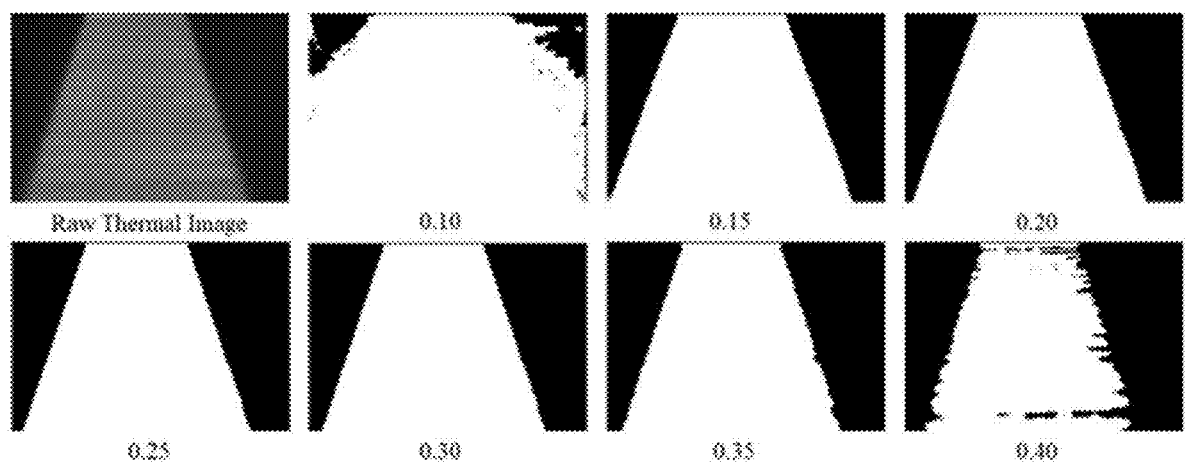
FIG. 14 is an example of Binary operations of thermal image with different thresholds in accordance to various embodiments of the present disclosure.

The implementation of the developed method entails a priori determination of user-defined parameters. The first one is the threshold for binary operation, which is associated with the boundary detection. Due to a sufficient temperature difference (about 10° C.) between the road surface and the environment, which manifests itself as the intensity difference in the thermal images, it is practically easy to select a proper threshold for binary operation. FIG. 14 shows one snapshot of thermal video recorded in the laboratory testing and its binary operation results with consideration of different thresholds from 0.1 to 0.4 in an increment step of 0.05. It reveals that the threshold in a range of 0.20 to 0.30 allows for suppressing details in the background sufficiently and consequently induce smooth and satisfactory boundaries on the binary image. Therefore, the threshold was finally specified as 0.20 for binary operation in the prototype.

Figure 15:
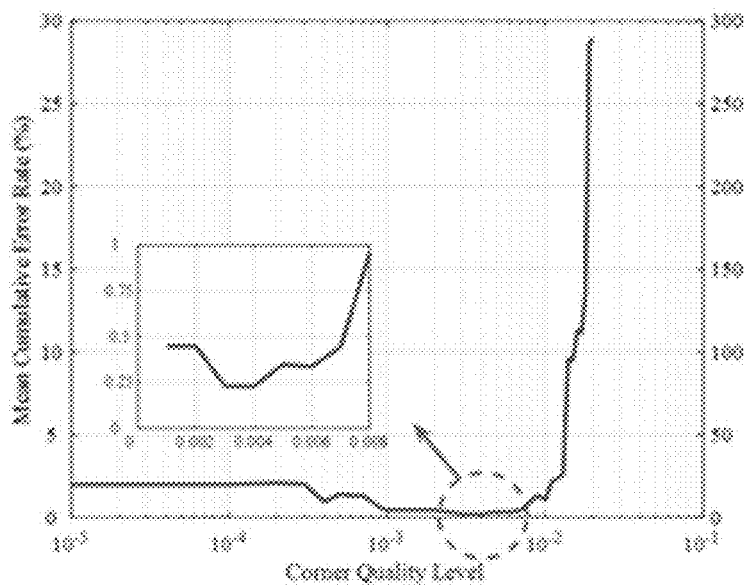
FIG. 15 is an example of a graphical representation illustrating a variation of mean cumulative error rate as change of corner quality level in accordance to various embodiments of the present disclosure.

The second parameter is the corner quality level, which is associated with the quality of corner detection and thus the performance of implementing the optical flow technique. A comparatively smaller corner quality level encourages the corner detector to detect more features across the field of view, but at the expense of generating a higher possibility of matching errors. Therefore, the corner quality level should not be too small. On the other hand, the corner quality level should not be too large because it will discard a large portion of feature points being detected, thus causing lost tracking between consecutive frames. To seek a proper corner quality level, a testing for the corner detection was carried out with consideration of a sufficiently wide range of corner quality level. To do so, the cart was smoothly moved along the third movement in Path 2 as depicted in FIG. 11; meanwhile, the infrared camera and Canon® camera were employed to acquire data. Then the recorded thermal video was fed into the developed software with choice of different corner quality levels. Subsequently, the camera trajectory corresponds to each corner quality level estimated by the developed method was compared with the result identified from the Canon® camera respectively. Performing the above process several times individually, and the mean longitudinal cumulative error rate was exploited to quantify the tracking performance of different corner quality level, which is defined as $$\Delta e_k = \sum_{i=1}^{n} \left| \frac{y_{i,p} - y_{i,r}}{y_{i,r}} \right| \qquad (25)$$

where $y_{i,p}$ and $y_{i,r}$ are the longitudinal translation distance estimated by the developed software and the ground truth data in ith run, respectively; n is the number of independent runs. A total of five independent runs were carried out in this process. FIG. 15 shows the variation of the mean cumulative error rate as the change of the corner quality level. The zoon-in window of the curve of the mean cumulative error rate shows that the mean cumulative error rate approaches its nadir when the corner quality level is set as 0.004. Therefore, the corner quality level of 0.004 was specified in the prototype for the laboratory testing.

Figure 16:
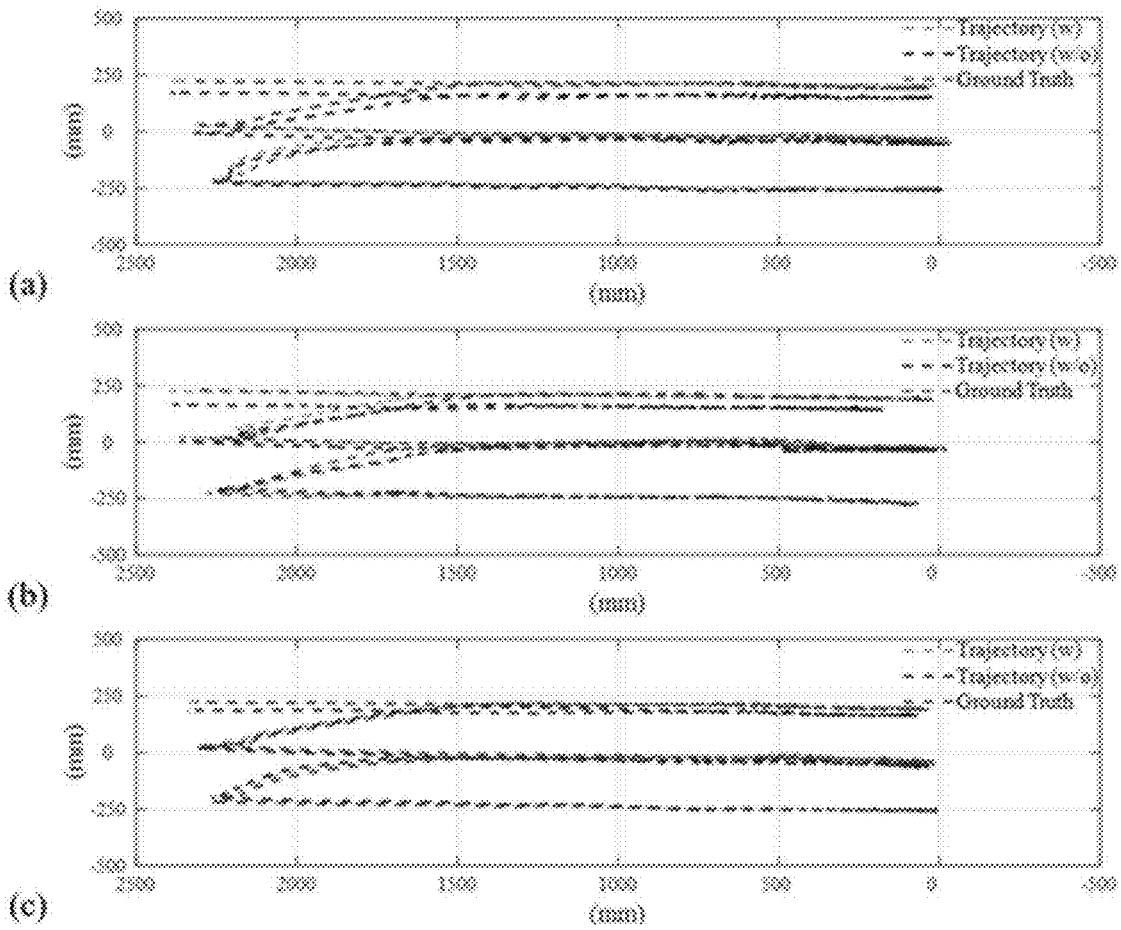
FIG. 16 is an example of a graphical representation illustrating a comparison between estimated trajectories by developed prototype and ground truth: (a) Run 1; (b) Run 2 and (c) Run 3 in accordance to various embodiments of the present disclosure.

Three independent tests following the rolling pattern depicted in FIG. 11 were conducted with the configuration parameters determined above, each of which was taken over about 11.30 m during a period of 75 s to 79 s. FIG. 16 displays the estimated camera trajectories from the developed prototype and the ground truth from the Canon® camera. It is evident that the camera trajectory estimated from the proposed prototype is quite consistent with the ground truth data in each run. Quantitative evaluation of the estimated camera trajectories from the developed prototype along the lateral direction and longitudinal direction were performed respectively, whose results are summarized in Table 3.

TABLE 3

Quantitative evaluation of camera trajectories estimated by developed prototype in laboratory testing

| | Lateral Direction | | | | Longitudinal Direction | | |
|---|---|---|---|---|---|---|---|
| | Mean Absolute Error (mm) | | Standard Deviation (mm) | | Incremental Translational | Cumulative Error Rate | Record Length |
| Results | with | without | with | without | Error (mm) | (%) | (s) |
| Run 1 | 4.933 | 24.937 | 5.144 | 22.694 | 65.636 | 0.538 | 79 |
| Run 2 | 4.605 | 29.728 | 5.573 | 17.397 | 103.952 | 0.852 | 75 |
| Run 3 | 5.182 | 18.004 | 4.499 | 16.980 | 47.452 | 0.390 | 78 |

Note:
"with" denotes "estimate with lateral position optimization module"; "without" denotes "estimate without lateral position optimization module".

For comparison purposes, the position measurements from the developed prototype were downsampled from 15 Hz to 6 Hz, the same sampling rate of the Canon camera. It turned out that the mean absolute error and standard deviation against the ground-truth data vary in a range of 4.933-5.182 mm and 4.499-5.144 mm in three runs, respectively. For the longitudinal direction, the maximum cumulative error rate is 0.852% which occurred in Run 2, and the mean cumulative error rate is 0.583%. This demonstrated the performance of the developed prototype for position tracking and mapping to a great extent.

To validate the effect of the lateral position optimization module in helping improve the estimation accuracy of the camera's lateral position, the camera trajectories after removing this module were also estimated by making use of the same recorded thermal videos. To facilitate the comparison, the estimated camera trajectories and the corresponding quantitative evaluation of lateral position estimation are also illustrated in FIG. 16 (e.g., FIG. 16(a)—Run 1, FIG. 16(b)—Run 2, FIG. 16(c) Run 3) and Table 3, respectively. Obviously, without applying the lateral position optimization module, there exists a distinct discrepancy between the estimated camera trajectory and the ground true trajectory in every run. Furthermore, the lateral error becomes significant after each path shifting, and the overall lateral departure gets truncated at the end of travel compared with the ground-truth trajectory. This is mainly caused by the systematic error derived from the translation assumption made in the proposed method as discussed earlier. According to the quantitative analysis, the average of the mean absolute error of lateral position reaches to around 24.223 mm without implementing the lateral position optimization module, which is about five (5) times of the one with implementation of the lateral position optimization module.

Field Validation

Figure 17:
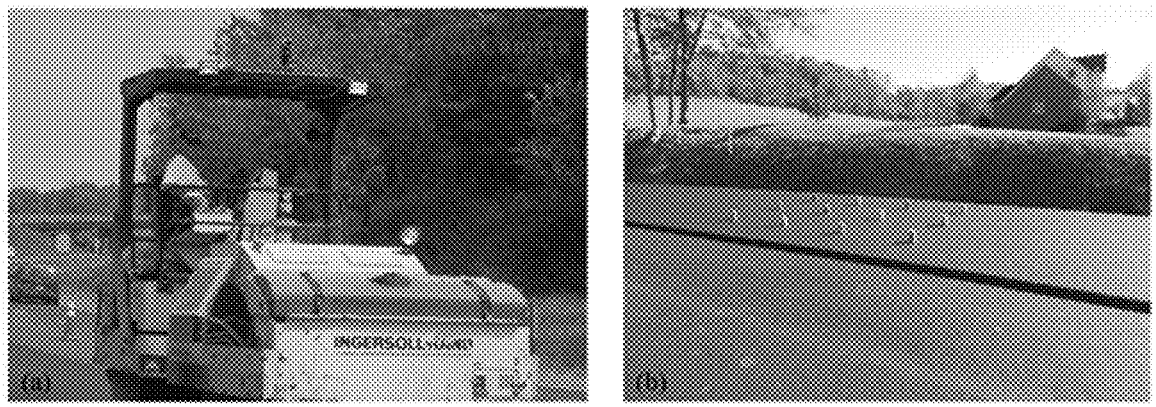
FIG. 17 illustrates an example of an experiment setup and calibration pattern in field testing: (a) experiment setup and (b) calibration pattern, in accordance to various embodiments of the present disclosure.

Preliminary field validation of the developed prototype was conducted during the construction of an HMA pavement on U.S. Route 50, outside Clarksburg, WV. The paving width of the pavement was 3.86 m, which was separated into two paths for roller compaction. A roller 203 (e.g., Ingersoll Rand DD 110 with a drum width of 198 cm (78 inch)) was employed during the compaction process with a static mode. To obtain the needed field of view for feature detection and tracking, the infrared camera was installed on the roof of the roller using a triple suction cup mount as shown in FIG. 17(a). The pitch angle of the camera was adjusted to about 10° and the camera height off the ground was 346.5 cm. The recorded thermal video was continuously streamed into the digital video recorder placed on the roller cabinet via the wired connection.

The infrared camera intrinsic parameters and the radial distortion coefficients were obtained in the laboratory ahead of the field testing, which are also summarized in Table 2. Following the camera calibration procedure illustrated previously, the projective relationship between the image plane and the pavement surface was determined on site based on a 3×4 calibration pattern arranged on the pavement surface with a known interval of 91.5 cm, as presented in FIG. 17(b). During the rolling process, the roller operator operated the roller to follow the predesigned rolling pattern from the contractor. That was, driving straightly along one working path and turning to the other path when the operator changed the movement from a back-or-forth rolling motion. The rolling operation lasted approximately fifteen minutes. The recorded thermal video was stored in the SD card built in the datalogger and copied to the laptop later for analysis. To obtain the longitudinal ground truth, a series of traffic cones were set along the compacted pavement with an interval of 10 m, as shown in FIG. 6. Taking the traffic cones as the references, the discrete longitudinal ground truth of the roller was obtained once the roller passed a certain traffic cone or changed the movement from a back-or-forth rolling motion. As to the lateral ground truth, it was measured in a point-wise manner using a tapeline immediately after the roller passed the measuring locations which were located at the same position as the traffic cones. Time of position measurements was also recorded to synchronize the roller position estimated by the developed prototype.

One clip of recorded thermal video with known roller traveling distance was used to initialize the two user-specified parameters, i.e., the threshold for binary operation and the corner quality level for corner detector. Likewise, the cumulative error rate along the longitudinal direction was employed to examine the reliability of the selected corner quality level. By trial and error, the corner quality level was determined as 0.006 for corner detection, and the threshold value was selected as 0.55 for binary operation.

Figure 18:
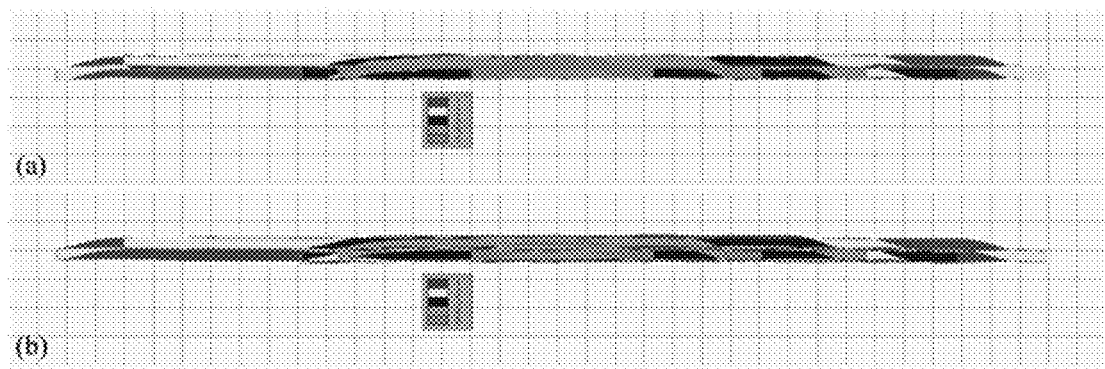
FIG. 18 illustrates an example graphical representation of color-coded roller pass coverage and counts: (a) with lateral position optimization module and (b) without lateral position optimization module in accordance to various embodiments of the present disclosure.

FIG. 18(a) shows the roller trajectory estimated by the prototype with consideration of the drum width of the roller 203, in which the different color corresponds to the different number of rolling passes. A total of eight back-and-forth movements were observed during this process. It is evident that the rolling passes on two lanes were in proximity to each other. The estimated total longitudinal traveling distance and the ground truth of the roller 203 were 946.6 m and 939.7 m, respectively, resulting in a cumulative error rate of 0.73% along the longitudinal direction. The mean absolute error and standard deviation of the lateral location estimation were 3.3 cm and 3.5 cm, respectively.

The roller trajectory without applying the lateral position optimization module was also examined. The result is presented in FIG. 18(b). Compared with the roller trajectory estimated with applying the lateral position optimization module, the two adjacent rolling passes estimated without applying the lateral position optimization module gradually deviate from each other after a long run. Accordingly, the mean absolute error and standard deviation of the lateral position of the roller increased up to 25.8 cm and 29.9 cm, respectively. This substantiated again that the lateral position optimization module effectively reduces the estimation error of the roller lateral position and helps to improve the pavement compaction path tracking and mapping.

To analyze the potential of the present disclosure as an alternative to the GPS-based IC, a comparison between them was conducted. Normally, the traditional IC roller is required to couple with a real-time kinematic (RTK) GPS due to the need of controlling the overlap distance between two adjacent rolling passes. Currently the state-of-art commercial GPS can reach a fixed accuracy of 1 to 3 cm.

Based on the validation results, the present disclosure can achieve a comparable accuracy (3.3 cm) as the GPS in roller's lateral position estimation with the help of the lateral position optimization. As far as the longitudinal position of the roller along the pavement was concerned, the achievable accuracy of the roller with the present disclosure is inferior to the counterpart estimated by GPS, due to the longitudinal error of roller position estimated by the proposed technology may cumulate after a long run. However, the roller's longitudinal position is not as essential as its lateral position for pavement quality, and therefore a slightly larger magnitude of errors is acceptable.

Assuming an asphalt pavement segment with a length of 150 m under compaction and a same cumulative error rate along the longitudinal direction as obtained in the field validation, it will lead to an estimation error of 1.095 m along the longitudinal direction after a back-or-forth rolling motion, which is acceptable in field application for pavement compaction. On the other hand, a low number of visible satellites, poor satellite constellation geometry and a poor radio line of sight between the base station and the GPS receiver may dramatically compromise the GPS precision to float accuracy (1 m to sub-meter) or even autonomous accuracy (10 to 15 m). This makes the quality control of pavement compaction conducted by GPS-based IC unreliable in some applications.

On the contrary, the systems and methods of the present disclosure is vision-based, and hence not restricted by the signal issues, making it overperform GPS in some signal-denied construction conditions especially in mountain areas. Furthermore, the cost of the technology of the present disclosure is much cheaper than the GPS equipment. Therefore, the technology of the present disclosure is promising to be an alternative to the GPS-based IC for roller position tracking and path mapping in pavement compaction.

Figure 19:
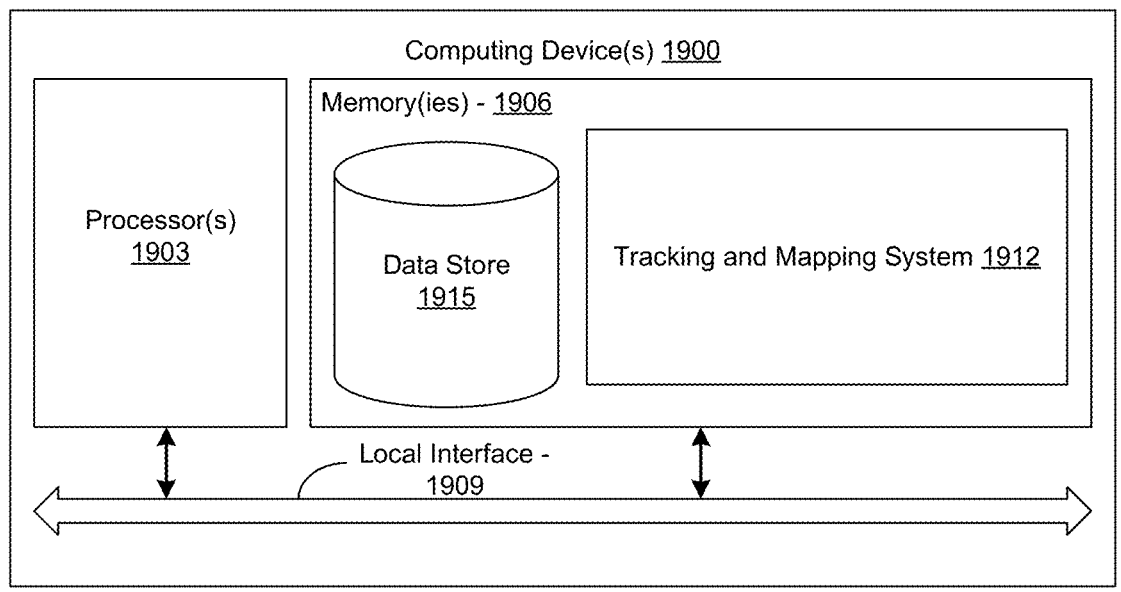
FIG. 19 is a schematic block diagram that provides one example illustration of a computing environment according to various embodiments of the present disclosure.

With reference now to FIG. 19, shown is one example of at least one computing device 1900 (e.g., an interfacing device, central server, server, or other network device) that performs various functions of the tracking and mapping algorithms in accordance with various embodiments of the present disclosure. Each computing device 1900 includes at least one processor circuit, for example, having a processor 1903 and a memory 1906, both of which are coupled to a local interface 1909. To this end, each computing device may be implemented using one or more circuits, one or more microprocessors, microcontrollers, application specific integrated circuits, dedicated hardware, digital signal processors, microcomputers, central processing units, field programmable gate arrays, programmable logic devices, state machines, or any combination thereof. The local interface 1909 may comprise, for example, a data bus with an accompanying address/control bus or other bus structure as can be appreciated. Each computing device 1900 can include a display for rendering of generated graphics such as, e.g., a user interface 900 and an input interface such, e.g., a keypad or touch screen to allow for user input. In addition, each computing device 1900 can include communication interfaces (not shown) that allows each computing device to communicatively couple with other communication devices. The communication interfaces may include one or more wireless connection(s) such as, e.g., Bluetooth or other radio frequency (RF) connection and/or one or more wired connection(s).

Stored in the memory 1906 are both data and several components that are executable by the processor 1903. In particular, stored in the memory 1906 and executable by the processor 1903 is the tracking and mapping system 1912, and/or other applications. Also stored in the memory 1906 may be a data store 1915 and other data. It is understood that there may be other applications that are stored in the memory 1906 and are executable by the processor 1903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, LabVIEW®, MATLAB® or other programming languages.

A number of software components are stored in the memory 1906 and are executable by the processor 1903. In this respect, the term "executable" means a program file that is in a form that can ultimately be run by the processor 1903. Examples of executable programs may be, for example, a compiled program that can be translated into machine code in a format that can be loaded into a random access portion of the memory and run by the processor 1903, source code that may be expressed in proper format such as object code that is capable of being loaded into a random access portion of the memory 1906 and executed by the processor 1903, or source code that may be interpreted by another executable program to generate instructions in a random access portion of the memory to be executed by the processor 1903, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1906 is defined herein as including both volatile and nonvolatile memory and data storage components. Volatile components are those that do not retain data values upon loss of power. Nonvolatile components are those that retain data upon a loss of power. Thus, the memory 1906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1903 may represent multiple processors and the memory 1906 may represent multiple memories that operate in parallel processing circuits, respectively. In such a case, the local interface 1909 may be an appropriate network that facilitates communication between any two of the multiple processors, between any processor and any of the memories, or between any two of the memories, etc. The local interface 1909 may comprise additional systems designed to coordinate this communication, including, for example, performing load balancing. The processor may be of electrical or of some other available construction.

Although the tracking and mapping system 1912, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

Also, any logic or application described herein, including the tracking and mapping system 1912 and/or application that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random-access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A system, comprising:
an infrared (IR) camera disposed on a roller vehicle used for compacting a surface;
at least one computing device in data communication with the IR camera; and
at least one application executable in the at least one computing device, wherein, when executed, the at least one application causes the at least one computing device to at least:
obtain a plurality of images from the IR camera the plurality of images showing a path ahead of the roller vehicle;
perform an analysis comprising boundary identification and feature tracking of at least one feature point associated with at least one cold point between boundaries, wherein the feature tracking tracks the at least one feature point through multiple ones of the plurality of images based at least in part on an optical flow vector field;
generate mapping and tracking data associated with a movement of the roller vehicle, the mapping and tracking data being based at least in part on the analysis of the images obtained from the IR camera;
generate a user interface comprising a visual representation of the tracking and mapping data associated with the compaction of the road surface; and
display the user interface via a display device of the at least one computing device, wherein an operator of the roller vehicle adjusts at least one of a roller position or a roller movement based at least in part on the tracking and mapping data displayed on the at least one computing device.

2. The system of claim 1, wherein the visual representation of the mapping and tracking data comprises a real-time representation of a rolling path associated with the roller vehicle and the surface.

3. The system of claim 1, wherein, when executed, the at least one application causes the at least one computing device to at least calibrate the IR camera.

4. The system of claim 1, wherein, when executed, the at least one application further causes the at least one computing device to at least determine a roller motion of a compacting roller of the roller vehicle based at least in part on the analysis of the plurality of images, the tracking and mapping data being based at least in part on the roller motion and identified boundaries.

5. The system of claim 4, wherein the roller motion is determined according to an estimated roller heading motion and a roller linear translation.

6. The system of claim 4, wherein, when executed, the at least one application further causes the at least one computing device to at least optimize a roller motion based at least in part on an optimized roller lateral position relative to the surface.

7. The system of claim 1, wherein, when executed, the at least one application further causes the at least one computing device to at least generate a summary of the tracking and mapping data upon completion of a compaction job by the operator.

8. The system of claim 7, wherein, when executed, the at least one application further causes the at least one computing device to at least transmit the summary to a client device.

9. The system of claim 1, wherein the plurality of images comprise thermal images of the surface.

10. The system of claim 1, wherein, when executed, the at least one application further causes the at least one computing device to at least identify one or more boundaries associated with the surface based at least in part on the plurality of images, the tracking and mapping data being based at least in part on the one or more boundaries.

11. A method, comprising:
obtaining, via at least one computing device, a plurality of images from an infrared (IR) camera disposed on a roller vehicle used for compacting a surface;
performing, via the at least one computing device, feature tracking of at least one feature point through multiple ones of the plurality of images based at least in part on an optical flow vector field;

generating, via the at least one computing device, mapping and tracking data associated with a movement of the roller vehicle, the mapping and tracking data being based at least in part on the analysis of the images obtained from the IR camera;

generating, via the at least one computing device, a user interface comprising a visual representation of the tracking and mapping data associated with the compaction of the road surface; and displaying, via the at least one computing device, the user interface via a display device of the at least one computing device, wherein an operator of the roller vehicle adjusts at least one of a roller position or a roller movement based at least in part on the tracking and mapping data displayed on the at least one computing device.

12. The method of claim 11, wherein the visual representation of the mapping and tracking data comprises a real-time representation of a rolling path associated with the roller vehicle and the surface.

13. The method of claim 11, further comprising calibrating the IR camera.

14. The method of claim 11, wherein a roller motion of a compacting roller of the roller vehicle based at least in part on the analysis of the plurality of images, the tracking and mapping data being based at least in part on the roller motion and identified boundaries.

15. The method of claim 14, wherein the roller motion is determined according to an estimated roller heading motion and a roller linear translation.

16. The method of claim 14, further comprising optimizing a roller motion based at least in part on an optimized roller lateral position relative to the surface.

17. The method of claim 11, further comprising generating a summary of the tracking and mapping data upon completion of a compaction job by the operator.

18. The method of claim 17, further comprising transmitting the summary to a client device.

19. The method of claim 11, wherein the plurality of images comprise thermal images of the surface.

20. The method of claim 11, further comprising identifying one or more boundaries associated with the surface based at least in part on the plurality of images, the tracking and mapping data being based at least in part on the one or more boundaries.

* * * * *